(12) United States Patent
Budagavi et al.

(10) Patent No.: US 12,217,368 B2
(45) Date of Patent: Feb. 4, 2025

(54) EXTENDED FIELD OF VIEW GENERATION FOR SPLIT-RENDERING FOR VIRTUAL REALITY STREAMING

(71) Applicant: Samsung Electronics Co., Ltd., Suwon-si (KR)

(72) Inventors: Madhukar Budagavi, Plano, TX (US); Youngkwon Lim, Allen, TX (US); Ravindranath Kanamangala, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 17/532,942

(22) Filed: Nov. 22, 2021

(65) Prior Publication Data

US 2022/0172440 A1    Jun. 2, 2022

Related U.S. Application Data

(60) Provisional application No. 63/243,448, filed on Sep. 13, 2021, provisional application No. 63/119,951, filed on Dec. 1, 2020.

(51) Int. Cl.
| | |
|---|---|
| *G06T 19/00* | (2011.01) |
| *G06F 3/01* | (2006.01) |
| *G06T 3/40* | (2024.01) |
| *G06V 20/40* | (2022.01) |
| *H04N 19/30* | (2014.01) |
| *H04N 21/414* | (2011.01) |

(Continued)

(52) U.S. Cl.
CPC ............ *G06T 19/006* (2013.01); *G06F 3/011* (2013.01); *G06T 3/40* (2013.01); *G06V 20/40* (2022.01); *H04N 19/30* (2014.11); *H04N 21/41407* (2013.01); *H04N 21/44213* (2013.01); *H04N 21/6332* (2013.01); *G06V 20/44* (2022.01)

(58) Field of Classification Search
CPC ......... G06T 19/006; G06T 3/40; H04N 19/30; H04N 21/41407; H04N 21/44213; H04N 21/6332; G06V 20/40; G06V 20/44; G06F 3/011
See application file for complete search history.

(56) References Cited

U.S. PATENT DOCUMENTS

| | | | |
|---|---|---|---|
| 10,062,414 B1 * | 8/2018 | Westphal | G11B 27/10 |
| 10,565,916 B2 | 2/2020 | So et al. | |

(Continued)

*Primary Examiner* — Jefferey F Harold
*Assistant Examiner* — Franklin S Andramuno

(57) ABSTRACT

An electronic device, a client device, and a method for split rendering video content are disclosed. The method includes receiving user data including viewpoint and motion data associated with a client device. The method also includes identifying a first portion of the video content corresponding to a field of view (FoV) of the client device based on the viewpoint. The method further includes identifying speed and direction of the client device based on the motion data. Additionally, the method includes identifying, based on the speed and the direction, a second portion of the video content extending from the first portion of the video content and expanding the FoV. The method also includes scaling the second portion of the video content using a scaling factor that is determined based on the speed. The method further includes transmitting the first and second portions of the video content and the scaling factor.

16 Claims, 17 Drawing Sheets

(51) Int. Cl.
    *H04N 21/442*     (2011.01)
    *H04N 21/6332*     (2011.01)

(56) References Cited

U.S. PATENT DOCUMENTS

| | | |
|---|---|---|
| 10,755,472 B2 | 8/2020 | Woo et al. |
| 10,757,346 B1 * | 8/2020 | Adams .................. G06V 20/49 |
| 10,902,681 B2 | 1/2021 | Uberti |
| 11,134,271 B2 * | 9/2021 | Shih ..................... H04N 19/119 |
| 2017/0257560 A1 * | 9/2017 | Edpalm .................. H04N 7/183 |
| 2018/0160119 A1 | 6/2018 | Su et al. |
| 2019/0206129 A1 * | 7/2019 | Khalid .................... A63F 13/88 |
| 2021/0055787 A1 | 2/2021 | Chhabra et al. |
| 2022/0394340 A1 * | 12/2022 | Jiang .................. H04N 21/4667 |

* cited by examiner

EXTENDED FIELD OF VIEW GENERATION FOR SPLIT-RENDERING FOR VIRTUAL REALITY STREAMING

CROSS-REFERENCE TO RELATED APPLICATION AND CLAIM OF PRIORITY

This application claims priority under 35 U.S.C. § 119(e) to U.S. Provisional Patent Application No. 63/119,951 filed on Dec. 1, 2020 and U.S. Provisional Patent Application No. 63/243,448 filed on Sep. 13, 2021. The above-identified provisional patent applications are hereby incorporated by reference in their entirety.

TECHNICAL FIELD

This disclosure relates generally to multimedia content. More specifically, this disclosure relates to extended field of view generation for split-rendering for virtual reality streaming.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. Even with the increase of computing power, electronic devices can struggle to provide the processing capabilities to handle new services and applications, such as streaming and displaying multimedia content, including virtual reality, as these often require more resources than an electronic device can provide.

Virtual reality experiences are becoming prominent due to recent innovations and products related to three dimensions (3D) and immersive media, such as content capture, processing, and distribution. For example, 360° video is emerging as a new way of experiencing immersive video due to the ready availability of powerful handheld devices such as smartphones. 360° video enables immersive "real life," "being there" experience for consumers by capturing the 360° view of the world. While the 360° video provides all around scenes, a user often views only a limited field of view. Therefore a server can send a portion of the 360° video to a client device since the client device displays a portion of each 360° frame. However, in this case if the user changes their view to view a different portion of the 360° video, the client device may not have the corresponding content to display to the user.

SUMMARY

This disclosure provides Extended field of view generation for split-rendering for virtual reality streaming.

In one embodiment, an electronic device is provided. The electronic device includes a processor operably coupled to a communication interface. The communication interface is configured to receive user data including viewpoint and motion data associated with a client device. The processor is configured to identify a first portion of the video content corresponding to a field of view (FoV) of the client device based on the viewpoint. The processor is also configured to identify a speed and a direction of the client device based on the motion data. The processor is further configured to identify, based on the speed and the direction, a second portion of the video content extending from the first portion of the video content and expanding the FoV. Additionally, the processor is configured to scale the second portion of the video content using a scaling factor that is determined based on the speed. The communication interface is further configured to transmit the first and second portions of the video content and the scaling factor to the client device.

In another embodiment, a method for split rendering video content is provided. The method includes receiving user data including viewpoint and motion data associated with a client device. The method also includes identifying a first portion of the video content corresponding to a FoV of the client device based on the viewpoint. The method further includes identifying speed and direction of the client device based on the motion data. Additionally, the method includes identifying, based on the speed and the direction, a second portion of the video content extending from the first portion of the video content and expanding the FoV. The method also includes scaling the second portion of the video content using a scaling factor that is determined based on the speed. The method further includes transmitting the first and second portions of the video content and the scaling factor.

In yet another embodiment a client device for split rendering video content is provided. The client device includes a transceiver, a motion sensor, a display, and a processor. The motion sensor is configured to detect motion of the client device. The processor is configured to transmit user data including the motion and a viewpoint of the client device. The processor is also configured to receive portion of the video content and a scaling factor. The processor is further configured to scale the portion of the video content using the scaling factor. Additionally, the processor is configured to select a segment of the portion of the video content corresponding to a current FoV from the portion of the video content. The processor is also configured to display the segment of the video content on the display.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
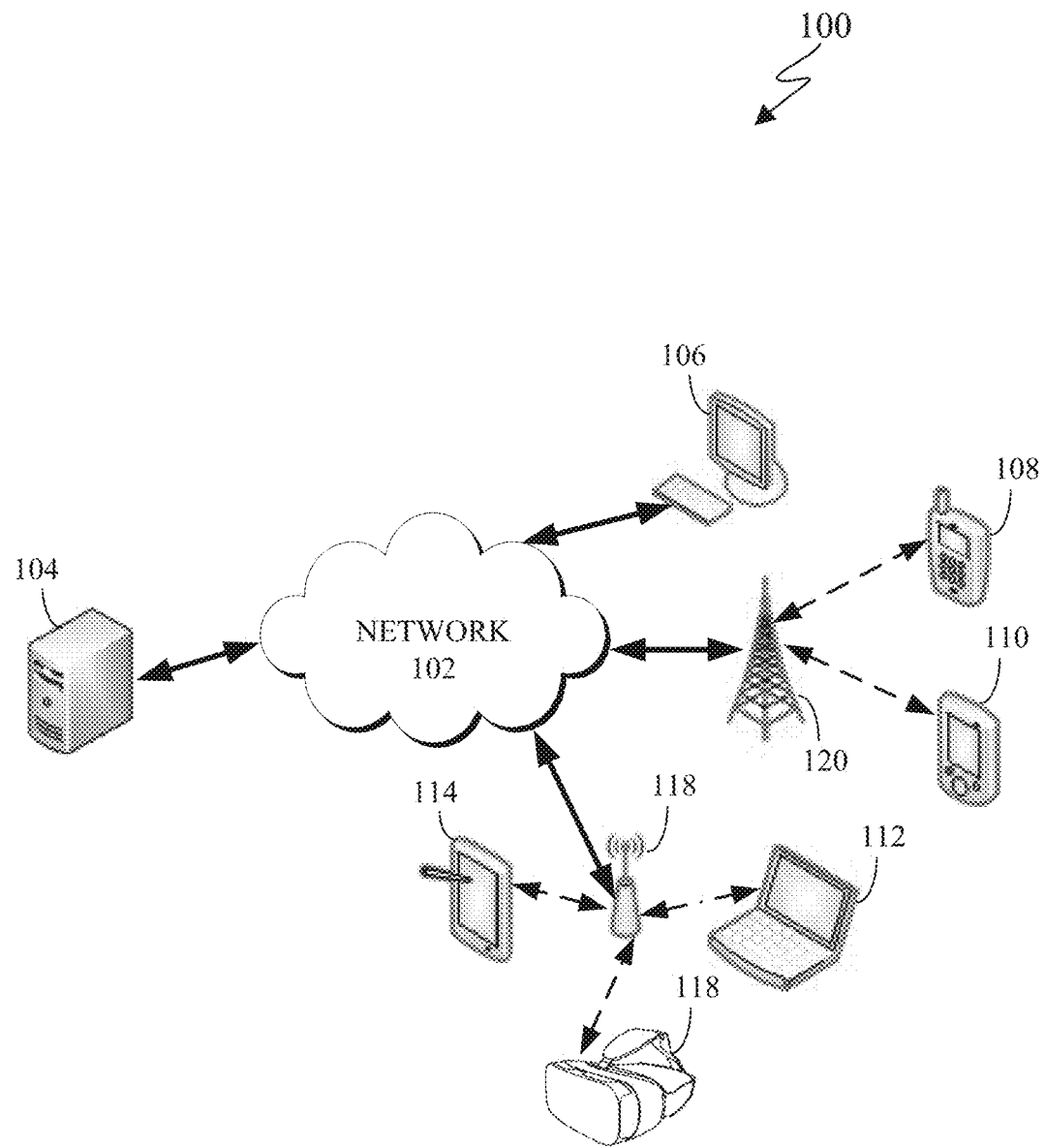
FIG. 1 illustrates an example communication system in accordance with an embodiment of this disclosure.

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include a personal computer (such as a laptop, a desktop), head mounted display, a workstation, a server, a television, an appliance, a client device, and the like. In certain embodiments, a client device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Virtual reality (VR) is a rendered version of a visual scene, where the entire scene is computer generated. For example, in a VR environment a user is fully immersed in a simulated digital environment. Augmented reality (AR) is an interactive experience of a real-world environment where objects that reside in the real-world environment are augmented with virtual objects, virtual information, or both. For example, in an AR environment, virtual objects can be overlaid on the real world. Mixed reality (MR) enables digital and real-world objects to co-exist and interact with one another in real-time. Extended reality (XR), as used herein refers to VR content, AR content, MR content, and the like. In certain embodiments, VR, AR and MR include both visual and audio experiences. A visual rendering is designed to mimic the visual stimuli, and if available audio sensory stimuli, of the real world as naturally as possible to an observer or user as the user moves within the limits defined by the application or the VR, AR, or MR scene. For example, VR places a user into immersive worlds that respond to detected head movements of a user. At the video level, VR is achieved by providing a video experience that covers as much of the field of view (FoV) as possible together with the synchronization of the viewing angle of the rendered video with the head movements.

Many different types of devices are able to provide the immersive experience associated with XR. One example device is a head-mounted display (HMD). An HMD represents one of many types of devices that provide XR experiences to a user. An HMD is a device that enables a user to view the XR scene and adjust the displayed content based on movements of the head of the user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same.

Volumetric video including XR content can be represented in different formats, such as panoramas or spheres. For example, volumetric video content can include a full 360° view, such that when a user changes their viewpoint they view different portions of the video. While the 360° video provides all around scenes, a user often views only a limited FoV. Various devices, such as an HMD can display portions of a spherical videos covering a full 360° view.

Embodiments of the present disclosure take into consideration that certain electronic devices, due to cost or mobility, lack the computational power required to render high-quality XR content on their own hardware. For example, certain electronic devices can struggle to provide the processing capabilities to handle receiving, decoding, and rendering an entire 360° video and then displaying only a portion of the 360° video.

Split rendering enables high-quality video to be rendered and displayed on low powered devices. That is, split rendering is the process where the decoding and rendering VR and volumetric video is split between two (or more) devices. For example, a split rendering system enables a server (such as an electronic device) to send a portion of the 360° video to a client device (or user device such as a head mounted display). By offloading certain aspects of video decoding and rendering to one or more servers in the local network or at the edge, and streaming the live-rendered content as video, a client device would merely need hardware decoders and network connections to enable high quality XR.

This is beneficial since the client device can lack the computational power required to render high-quality XR content but still provide high-quality XR content to a user. Additionally, since the client device displays only a portion of each 360° frame, it does not need to receive the entire 360° video, thereby reducing the bandwidth needed to transmit the video from its source to the client device. For example, a server can receive, from a client device, a viewpoint of that client device (corresponding to a FoV of a user) and provide to that client device the portion of the 360° video corresponding to that viewpoint. The client device then decodes and renders the received portion of the 360° video. Embodiments of the present disclosure take into consideration that if the user changes their view to view a different portion of the 360° video, the client device may not have the necessary video from the server to display.

In certain embodiments, split rendering for XR streaming uses two or more devices, that of an electronic device (such as a Multi-access Edge Computing (MEC) server) and a client device (such as a XR device, mobile phone, TV, AR glasses, head mounted display, and the like). Split rendering is the process where the decoding and rendering of a volumetric video is split between a client device and the electronic device. The electronic device (such as a MEC server) receives from client device the user viewpoint information. The viewpoint information of the user can be the viewing direction (yaw, pitch and roll) of the head as well as the eyes for 360° video. Alternatively, the viewpoint information of the user can be the head position (x, y, x) of the user coupled with the viewing direction for six degrees of freedom (DoF) volumetric content.

In certain embodiments, the electronic device (such as a MEC server) decodes and renders the volumetric video into a 2D frame corresponding to FoV visible on the client device (XR device) and compresses and transmits the 2D frame back to the client device (XR device). Since the user viewpoint may have changed between the time it was sent to MEC server and the time the MEC rendered 2D image is displayed on XR device, the MEC server can send a bigger image containing the extended FoV to allow for user viewpoint changes.

For example, a client device detects motion (including direction) of a user's head at time T1. The client device sends the motion information to the server. Alternatively, the client device can send multiple viewpoints over successive times instances, enabling the server to determine the speed and direction of the motion of the client device. The server determines a FoV (based on the received motion information or multiple viewpoints). The server also determines an extended FoV (which is larger than the FoV) based on the motion of the user's head at time T1. The extended FoV covers a larger area than the actual FoV. The server, then sends the extended FoV to the client device. After the client device receives the extended FoV, the client device detects users motion a time T2. The client device then determines a FoV based on the detected motion at time T2. Since the extended FoV is larger than the FoV the client device identifies a portion of the extended FoV to display. Then at time T3, the client device displays the determined FoV. It is noted that the time difference between T2 and T3 is related to motion to photon (MTP) latency.

Embodiments of the present disclosure take into consideration that when determining an extended FoV, the server can use a predetermined constant to control how much the FoV should be extended. When determining the size of the extended FoV the server balances two conflicting factors. First, as the size extended FoV increases, the client device is forced to perform more processing, reducing the effectiveness of split rendering. Second, if the size of the extended FoV is not large enough, any change in the viewpoint of the user could cause the client device to not have the necessary video content to render and display. For example, when the user suddenly moves their head, such as to view an entirely new portion of the 360° video, the client device may not have content associated with that portion of the 360° video. By increasing the size of the extended FoV to avoid missing data due to changes in viewpoint, can lead to increased bitrate since the frame size increases.

Accordingly, embodiments of the present disclosure describe extending a FoV based on head speed (velocity). Embodiments of the present disclosure also describe asymmetric FoV extensions based on head speed (velocity) and direction. For example, the FoV can be extended asymmetrically along the direction of the head motion to reduce the probability of the user viewport falling outside the extended FoV. Embodiments of the present disclosure further describe compacting (scaling) the extended FoV based on head speed (velocity). For example, the extended FoV sub-image can be compacted by a scale factor based on the head motion. If the head velocity is very high a stronger scaling (lower scaling factor) can be used. If the head velocity is low, a weak scaling (higher scaling factor) or no scaling can be used. The final extended FoV image is then compressed and sent to the client device. metadata needed to invert the scaling is also sent from the electronic device to the client device. The client device can then decompress the received image use the metadata to invert the scaling process.

Additionally, embodiments of the present disclosure describe event based lookahead for split rendering, such that the server generates video content associated with a future event in addition to an extended FoV corresponding to a current FoV. For example, a sub-image can also be selected based on events which might draw the attention of the user, such as introduction of an enemy in the scene during the computer game.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate internet protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a head mounted display (HMD), or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can generate the immersive content that is captured by one or more of the client devices 106-116.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more animated scans. The HMD 116 can display a 360° scene of immersive content that is captured by multiple devices.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to generate the immersive content and transmit the content to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can generate immersive content, transmit the immersive content, receive and render generate the immersive content, or a combination thereof. For example, the mobile device 108 can capture video of an event and transfer the video to another client device or to a server (such as the server 104) to generate immersive content. Additionally, any of the client devices 106-116 and the server can work together to perform split rendering.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
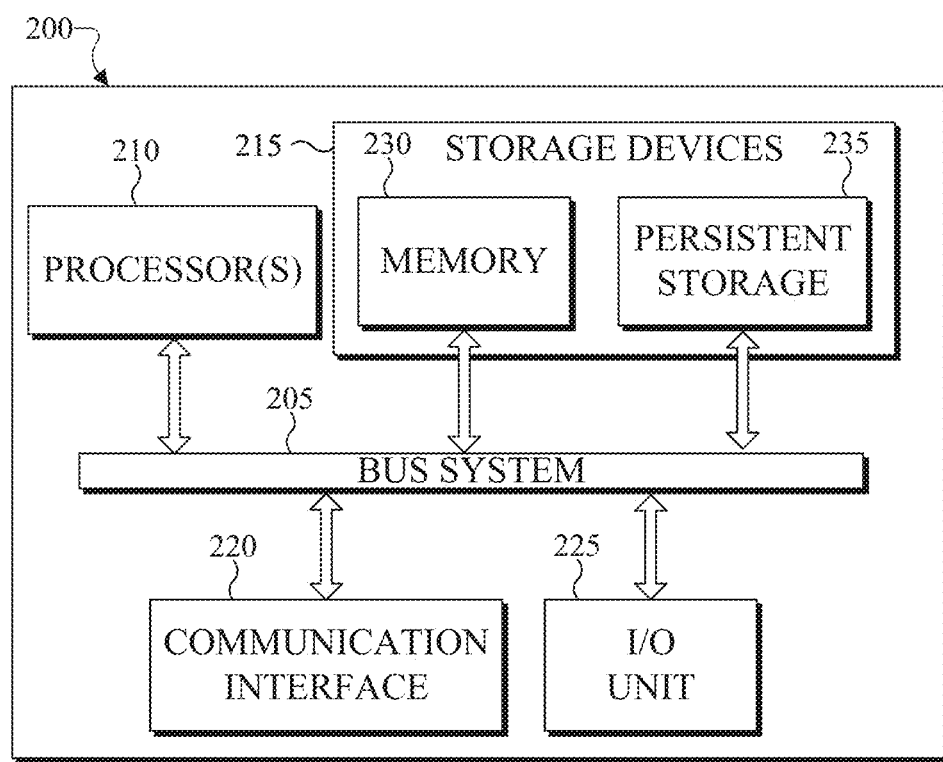
FIGS. 2 and 3 illustrate example electronic devices in accordance with an embodiment of this disclosure.
Figure 3:
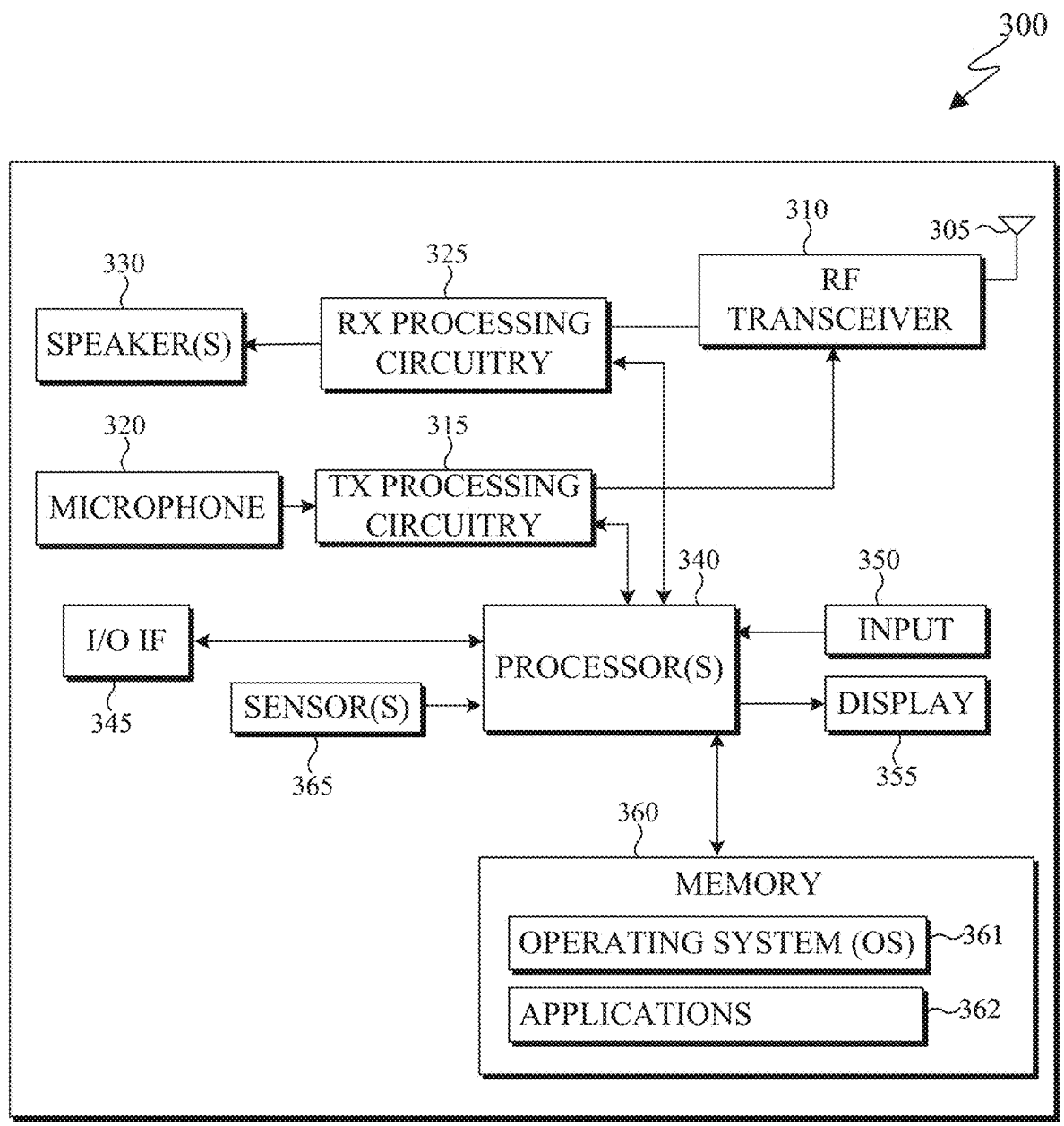

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, one or more media processing services, one or more encoding servers, an MEC server, and the like. As shown in FIG. 2, the server 200 includes a bus system 205 that supports communication between at least one processing device (such as a processor 210), at least one storage device 215, at least one communication interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can combine various streams of media of the same event to create an immersive content.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for creating immersive content from multiple data streams. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communication interface 220 supports communications with other systems or devices. For example, the communication interface 220 could include a network interface card or a wireless transceiver facilitating communications over the network 102 of FIG. 1. The communication interface 220 can support communications through any suitable physical or wireless communication link(s). For example, the communication interface 220 can transmit immersive content to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is captures content of an event. For example, the electronic device 300 is usable with data transfer, capturing content based on various parameters, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361 and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include a VR or AR application, a camera application (for still images and videos), a video phone call application, an email client, a social media client, a SMS messaging client, a virtual assistant, and the like.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user to interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects and immersive content.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, immersive content, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor/camera), a depth sensor, a D-RGB sensor (depth Red Green Blue sensor/camera), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
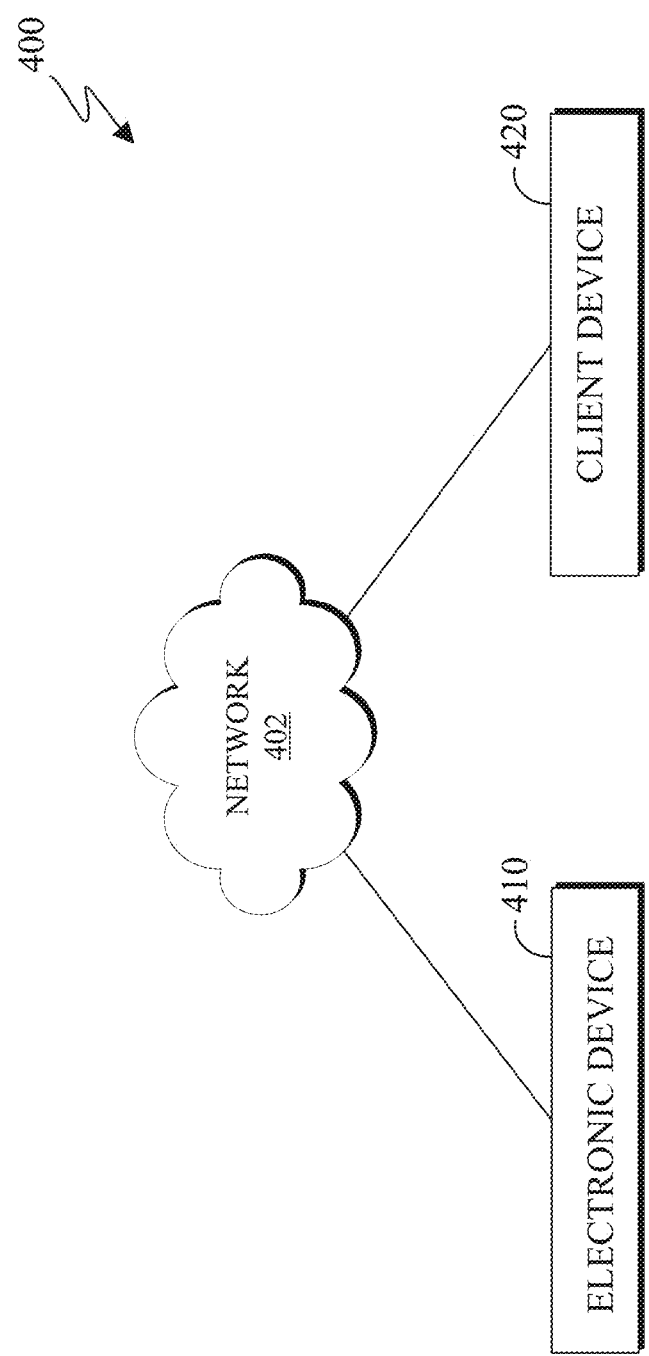
FIG. 4A illustrates a block diagram of an example environment-architecture in accordance with an embodiment of this disclosure.
Figure 4B:
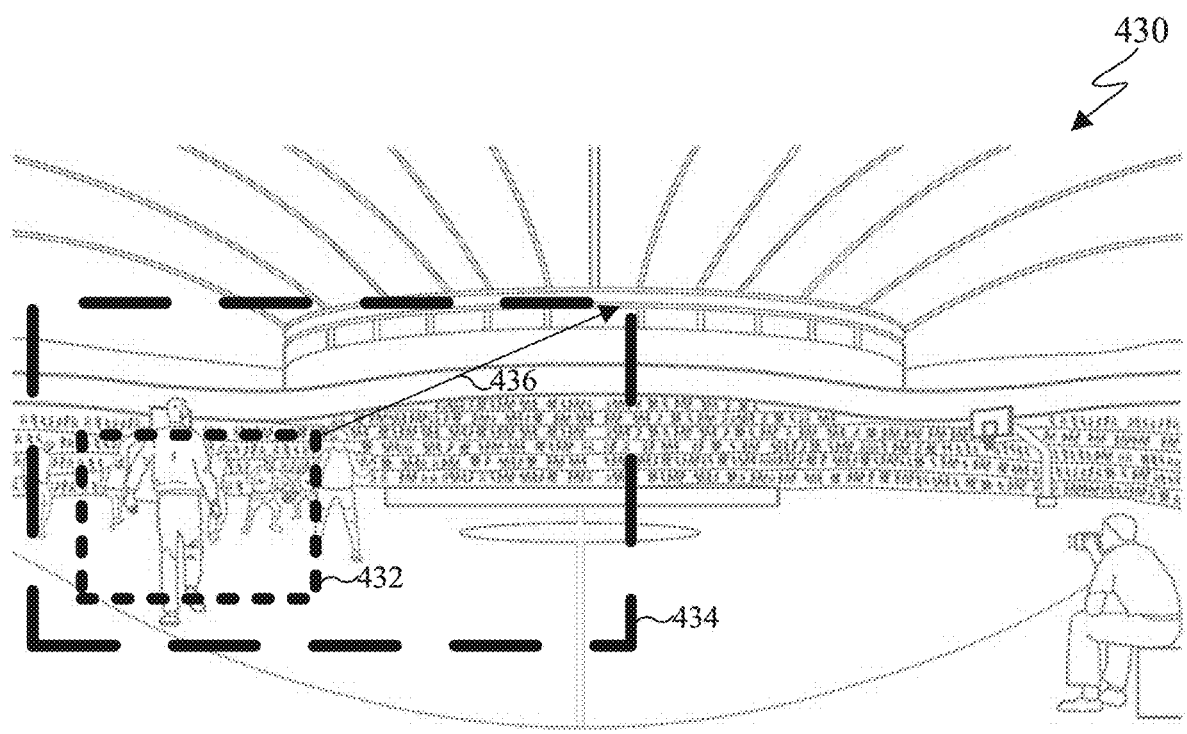
FIGS. 4B and 4C illustrate example video types in accordance with an embodiment of this disclosure.
Figure 4C:
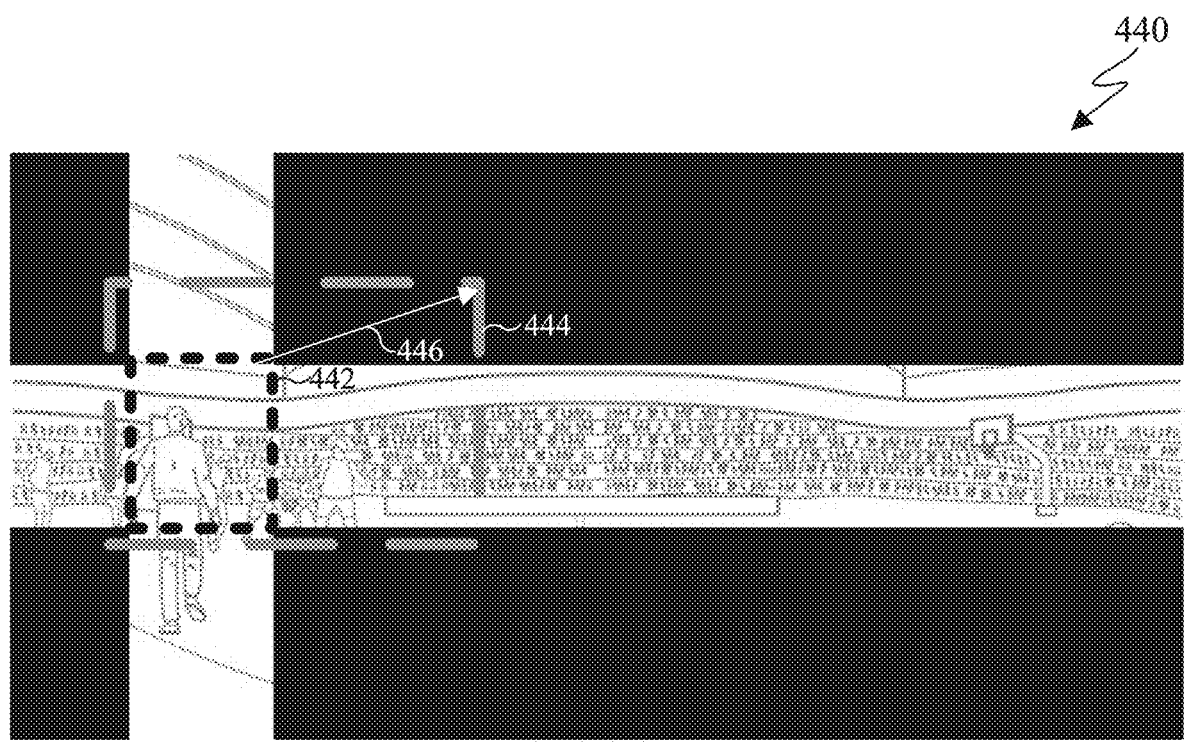

FIG. 4A illustrates a block diagram of an example environment-architecture 400 in accordance with an embodiment of this disclosure. FIGS. 4B and 4C illustrate example video types in accordance with an embodiment of this disclosure. The embodiment of FIGS. 4A, 4B, and 4C are for illustration only. Other embodiments can be used without departing from the scope of this disclosure.

The example environment-architecture 400, as shown in FIG. 4A, includes an electronic device 410 and a client device 420 in communication over a network 402. In certain embodiments, the electronic device 410 is a server (such as a MEC server) and the client device 420 is an XR device such as an HMD.

The network 402 can be the same as or similar to the network 102 of FIG. 1. In certain embodiments, the network 402 represents a "cloud" of computers interconnected by one or more networks, where the network is a computing system utilizing clustered computers and components that act as a single pool of seamless resources when accessed. Also, in certain embodiments, the network 402 is connected with one or more servers (such as the server 104 of FIG. 1, the server 200), one or more electronic devices (such as the client devices 106-116 of FIG. 1, the electronic device 300), the electronic device 410, and a client device 420. Further, in certain embodiments, the network 402 can be connected to an information repository (not shown) that contains XR media content that can be encoded by the electronic device 410, rendered and displayed to a user by the client device 420.

In certain embodiments, the electronic device 410 and the client device 420 can represent the server 104, one of the client devices 106-116 of FIG. 1, the server 200 of FIG. 2, the electronic device 300 of FIG. 3, or another suitable device. In certain embodiments, the electronic device 410 can be a "cloud" of computers interconnected by one or more networks, where each is a computing system utilizing clustered computers and components to act as a single pool of seamless resources when accessed through the network 402. In some embodiments, a portion of the components included in the electronic device 410 or the client device 420 can be included in different devices, such as multiple servers 104 or 200, multiple client devices 106-116, or other combination of different devices. In certain embodiments, the electronic device 410 and the client device 420 work together when performing split rendering.

The electronic device 410, receives 3D media content, such as a 360° video, from another device such as a server (similar to the server 104 of FIG. 1, the server 200 of FIG. 2), an information repository (such as a database), or one of the client devices 106-116. In certain embodiments, the electronic device 410 can receive media content from multiple cameras and stitch the content together to generate a 3D scene that includes one or more point clouds. Additionally, the electronic device 410 can receive user data from the client device 420 via the network 402. The user data can include a viewpoint of the user and motion data.

The client device 420 can include a motion sensor (similar to the sensor 365 of FIG. 3) and a display (similar to the display 355 of FIG. 3). The motion sensor can be used to detect the viewpoint information of the user. For example, the motion sensor can detect the viewing direction, including yaw, pitch and roll of the head. For another example, the motion sensor can be used to identify a position of the head coupled with a viewing direction. The display of the client device 420 can be similar to the display 355 of FIG. 3.

FIGS. 4B and 4C illustrate example video types, in accordance with an embodiment of this disclosure. Video content can be immersive 360° video. As shown in FIG. 4B, the video content can be a video equirectangular projection video 430 As shown in FIG. 4C, the video content can be cube map video 440.

Since the user using a client device 420 can view a portion of the video at a time, the electronic device 410 can transmit the portion of the video corresponding to the viewpoint of the user. Since the viewpoint of the user can change from a time when the viewpoint information is transmitted to the electronic device 410 to when the client device receives the portion of the video content, the electronic device 410 can transmit an extended FoV that includes additional video content to accommodate slight changes in the viewpoint.

Embodiments of the present disclosure take into consideration that extended FoV can be increased to avoid missed data due to fast head motion. However as the size extended FoV increases, can also leads to increased bitrate (since video frame size increases). Therefore, embodiments of the present disclosure describe that the extent that the FoV is extended is based on head velocity. For example, the FoV is extended along the direction of the head motion as shown in FIGS. 4B and 4C. This extended FoV image is then transmitted by the electronic device 410 (such as a server or a MEC) to the client device 420 (such as an XR device). By extending the FoV in certain direction reduces both (i) the probability of the viewport falling outside the extended FoV and avoiding missing data and (ii) the bitrate since the video frame size can decrease.

FIG. 4B illustrate example video, equirectangular projection video 430. The box corresponding to the viewpoint 432 represents a FoV and the box corresponding to the extended FoV 434 is based on the motion 436 of the user. Similarly, FIG. 4C illustrates an example cube map video 440. The box corresponding to the viewpoint 442 represents a FoV and the box corresponding to the extended FoV 444 is based on the motion 446 of the head of the user. That is, the extension of the FoV along the direction of the head motion (such as motion 436 and 446) can lead to asymmetric FoV extensions (such as the extended FoV 434 and 444), based on the type of video.

Although FIGS. 4A, 4B, and 4C illustrate the environment-architecture 400 and various video types of various changes can be made to FIGS. 4A, 4B, and 4C. For example, any number of electronic devices or client devices can be included environment-architecture 400. For another example, other types of video formats can be used for split rendering.

Figure 5A:
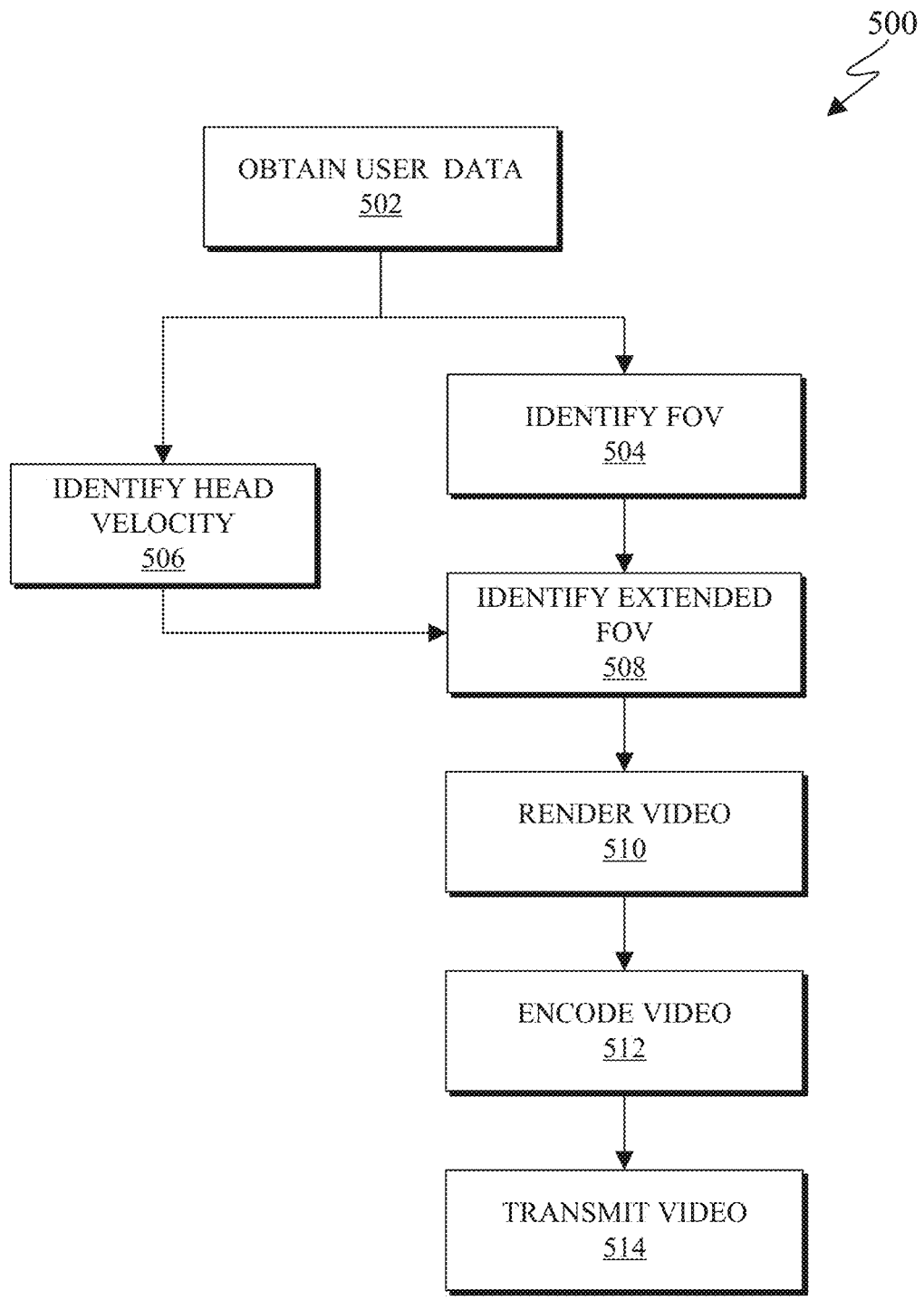
FIG. 5A illustrates an example method for split rendering in accordance with an embodiment of this disclosure.
Figure 5B:
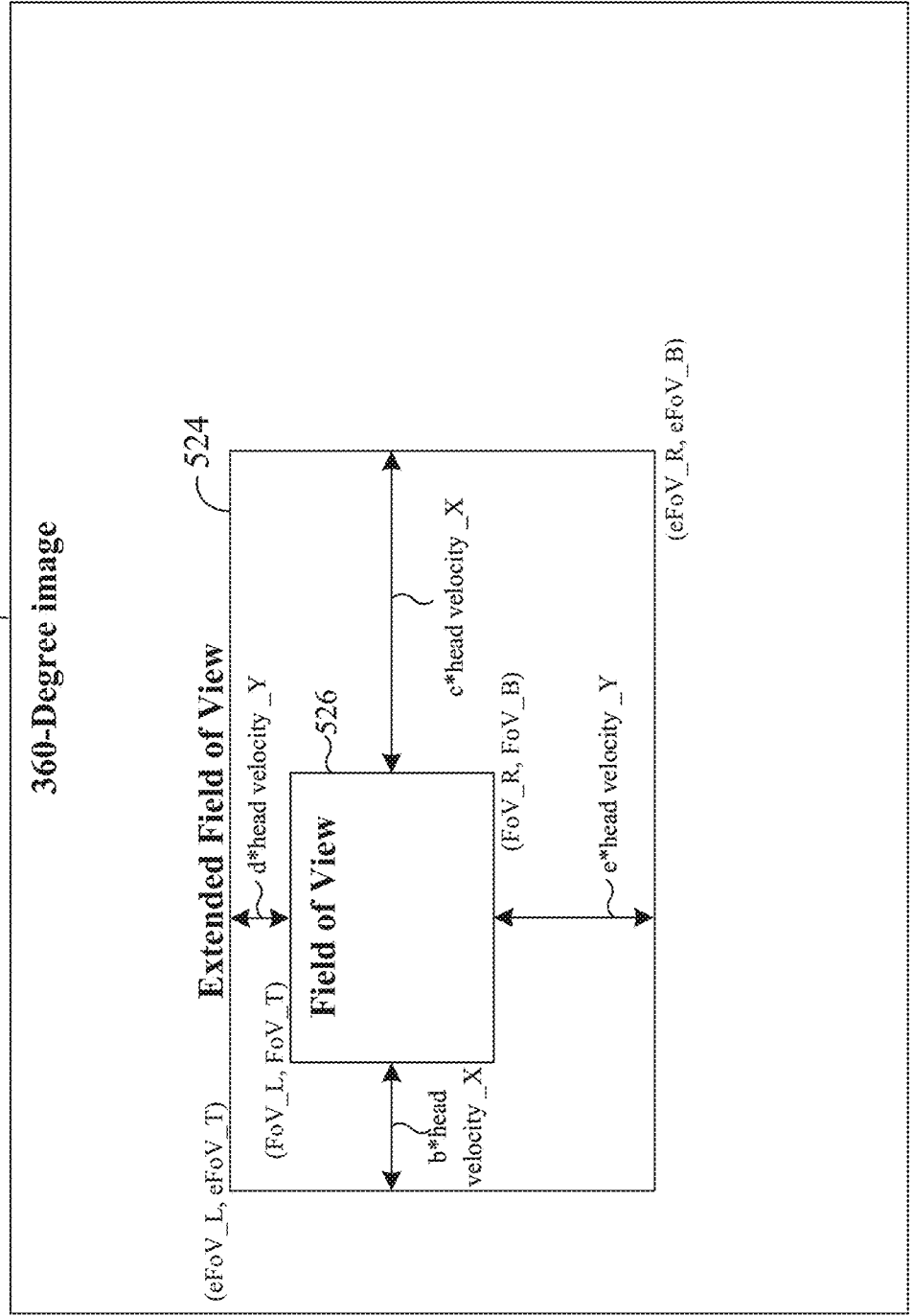
FIGS. 5B, 5C, and 5D illustrate diagrams for extending the field of view (FoV) based on motion in accordance with an embodiment of this disclosure.
Figure 5C:
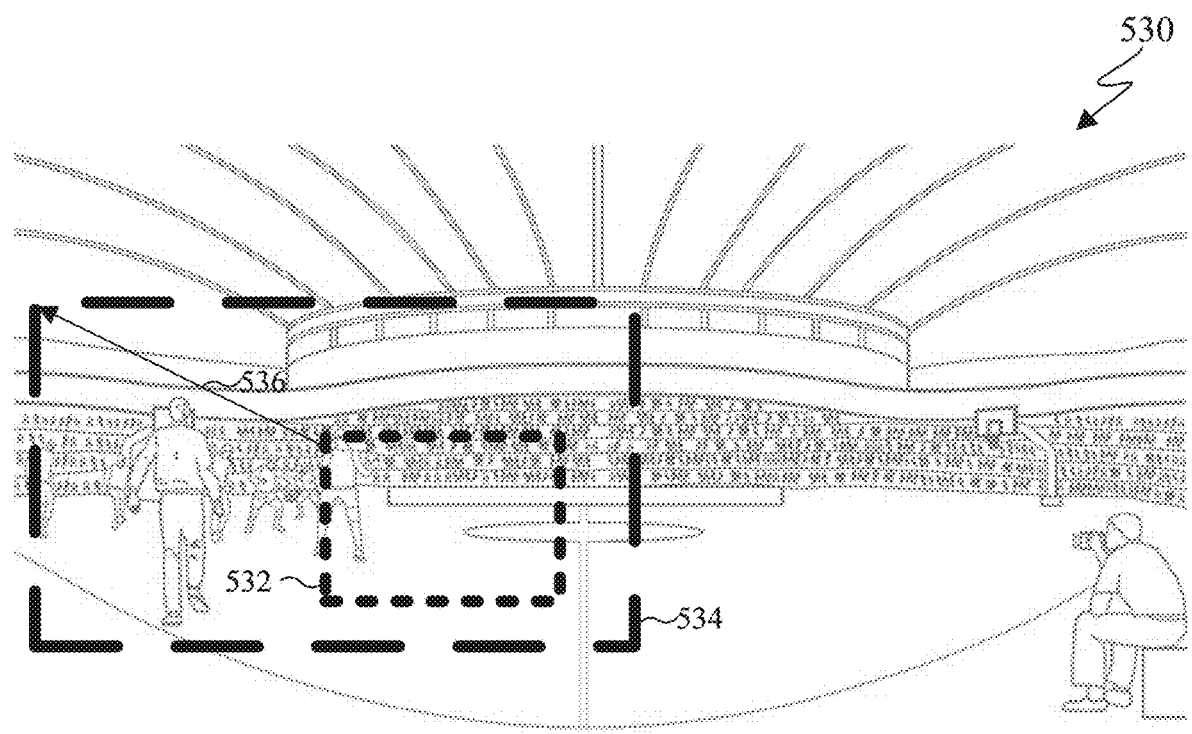
Figure 5D:
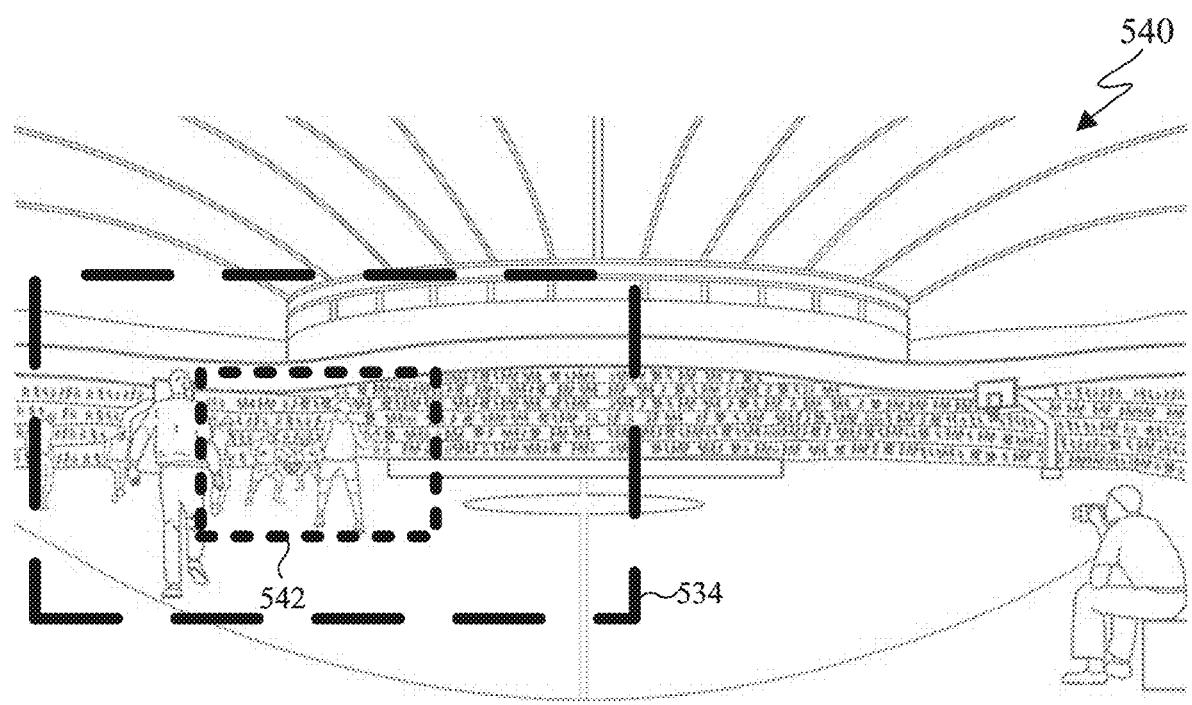

FIG. 5A illustrates an example method 500 for split rendering in accordance with an embodiment of this disclosure. FIGS. 5B, 5C, and 5D illustrate diagrams 520, 530, and 540 respectively, for extending the FoV based on motion in accordance with an embodiment of this disclosure.

The method 500 is described as implemented by any one of the client device 106-116 of FIG. 1, the server 104 of FIG. 1, or the electronic device 410, and can include internal components similar to that of server 200 of FIG. 2 and the electronic device 300 of FIG. 3. However, the method 500 as shown in FIG. 5A could be used with any other suitable electronic device and in any suitable system. The embodiments of FIGS. 5A, 5B, 5C and 5D are for illustration only. Other embodiments can be used without departing from the scope of this disclosure.

In step 502, the electronic device 410 (such as a MEC server) obtains user data from a client device 420 (such as an XR device). The user data can include the viewpoint of the client device 420. The user data can include motion data such as a speed (velocity) and direction of motion as detected by the client device 420. In certain embodiments, the user data includes multiple viewpoints in addition to or in alternative of the motion data.

In step 504, the electronic device 410 identifies the FoV centered around the user viewpoint. In step 506, the electronic device 410 identifies the head velocity. In certain embodiment, the electronic device 410 uses historical data from the previous user viewpoints, to determine the velocity of the client device 420. The head velocity could be based on simple regression or a complicated neural network. In other embodiments, the electronic device 410 receives motion data from a sensor of the client device 420 to determine the velocity of the client device 420.

In step 508, the electronic device 410 identifies the extended FoV based on the current FoV (from step 504) and the identified velocity (step 506). In step 510, the electronic device 410 renders the volumetric video that lies in the extended FoV. In step 512, the electronic device 410 compresses the resulting rendered video frame using a video encoder. In step 514, the electronic device transmits the compressed video to the client device 420.

FIG. 5B illustrates the diagram 520 for calculating the corners of the extended FoV. As illustrated, FoV_L, FoV_R, FoV_T, and FoV_B are the respective left, right, top bottom corners of the FoV, and eFoV_L, eFoV_R, eFoV_T, and eFoV_B are the respective left, right, top bottom corners of the extended FoV. Equation (1) describes the predefined head velocity in terms of FoV X-axis and Y-axis directions or yaw and pitch, respectively.

$$hv = (hv_x, hv_y) \quad (1)$$

Equations (2)-(5), below, describe the corners of the extended FoV.

$$eFoV\_L = FoV\_L - b*hv_x \quad (2)$$

$$eFoV\_R = FoV\_R + c*hv_x \quad (3)$$

$$eFoV\_T = FoV\_T - d*hv_y \quad (4)$$

$$eFoV\_B = FoV\_B + e*hv_y \quad (5)$$

Here, the variables b, c, d, and e are predetermined constants that control how much of the FoV should be extended based on head velocity. That is, the head velocity in the X or Y directions control the size of the extended FoV.

The diagram 520 of FIG. 5B shows a 360 degree image 522 and a FoV 526. The FoV 526 is a portion of the entire 360 degree image 522. The extended FoV 524 is based on the Equations (2)-(5). For six DOF scenes, the volumetric scene is rendered with FoV 526 set to the extended FoV 524.

The diagram 530 of FIG. 5C illustrates the electronic device 410 determining the extended FoV 534 based on the viewpoint 532 and the motion 536 that are obtained from the client device 420. The diagram 540 of FIG. 5D illustrates the client device 420 rendering a portion 542 of the extended FoV 534 that is received from the electronic device 410. For example, at a given time, $T_1$, the electronic device 410 receives user data including the viewpoint 432. The electronic device can also receive the motion data (motion 436) from the client device 420, multiple viewpoints for determining the motion of the client device, or both. The electronic device 410 determines the size of the extended FoV based on the received user data, using the Equations (2)-(5). At time T2, the electronic device 410 sends the extended FoV to the client device 420. Upon the client device 420 receiving the extended FoV 534 from the electronic device 410, the client device 420 determines a portion 542 of the extended FoV 534 that corresponds to the current FoV at time $T_3$. It is noted that time $T_2$ and time $T_3$ occurs after the time $T_1$. As illustrated, the portion 542 of FIG. 5D is both higher and to the left as compared to the viewpoint 532 of FIG. 5C, which roughly corresponds to the direction of the motion 536.

Although FIG. 5A illustrates one example of the method 500, various changes may be made to FIG. 5A. For example, while shown as a series of steps, various steps in FIG. 5A could overlap, occur in parallel, or occur any number of times. The embodiments of FIGS. 5A-5D are for illustration only. Other embodiments can be used without departing from the scope of this disclosure.

Figure 6A:
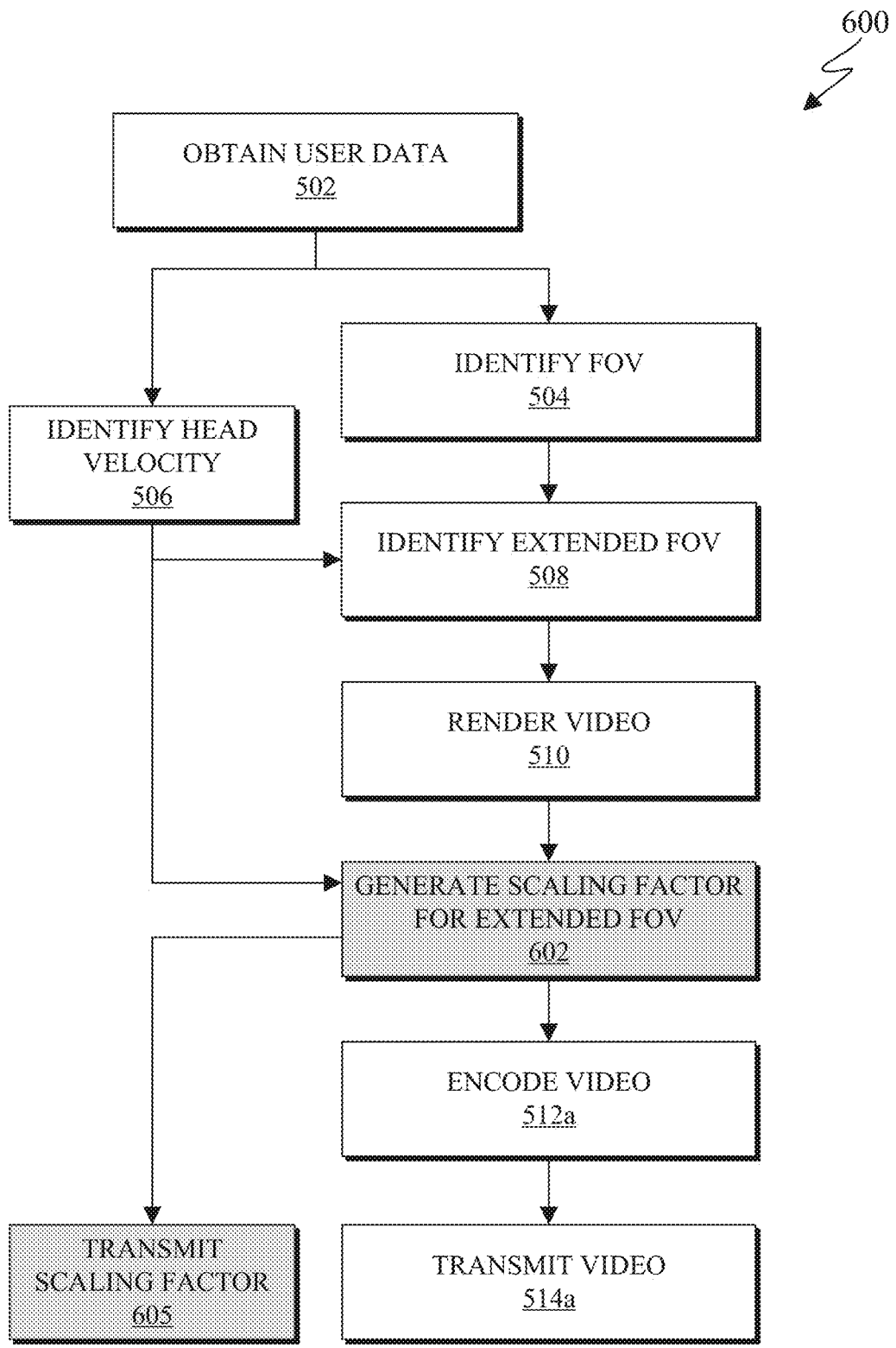
FIG. 6A illustrates an example method for scaling a split rendering in accordance with an embodiment of this disclosure.
Figure 6B:
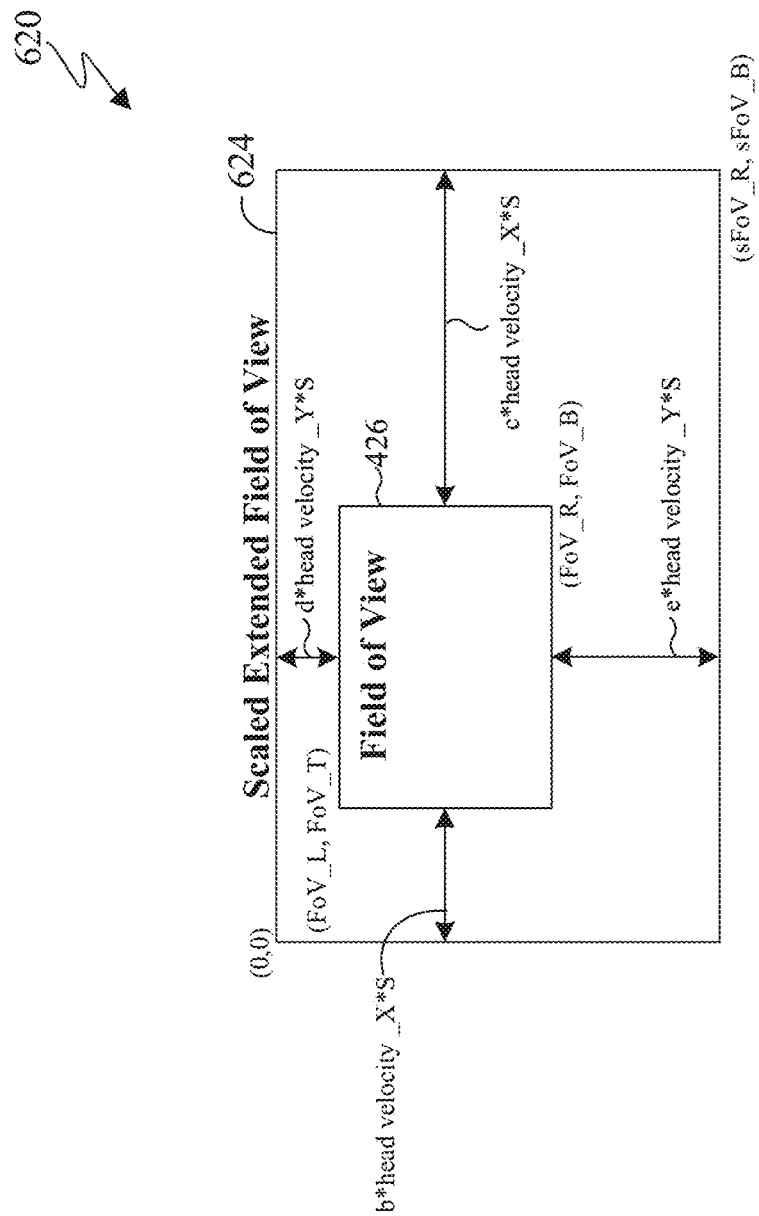
FIGS. 6B and 6C illustrate diagrams for scaling an extended FoV based on motion in accordance with an embodiment of this disclosure.
Figure 6C:
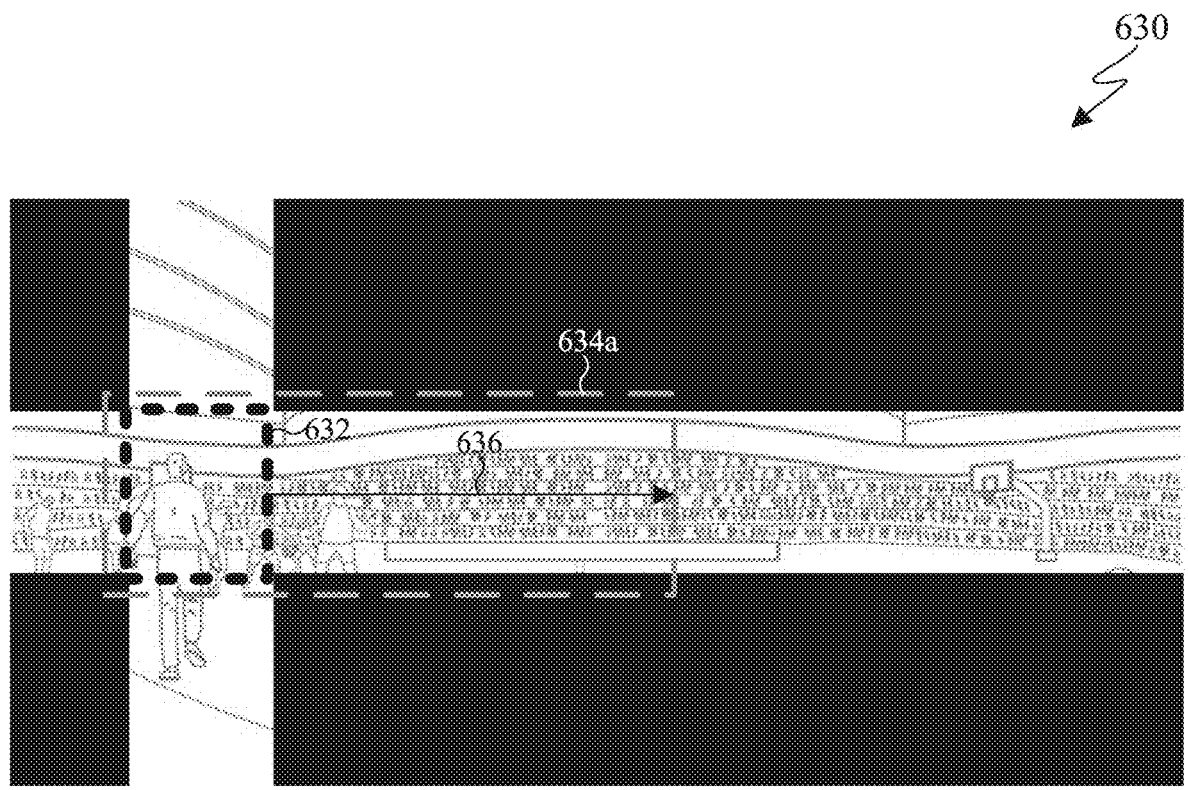
Figure 6C:
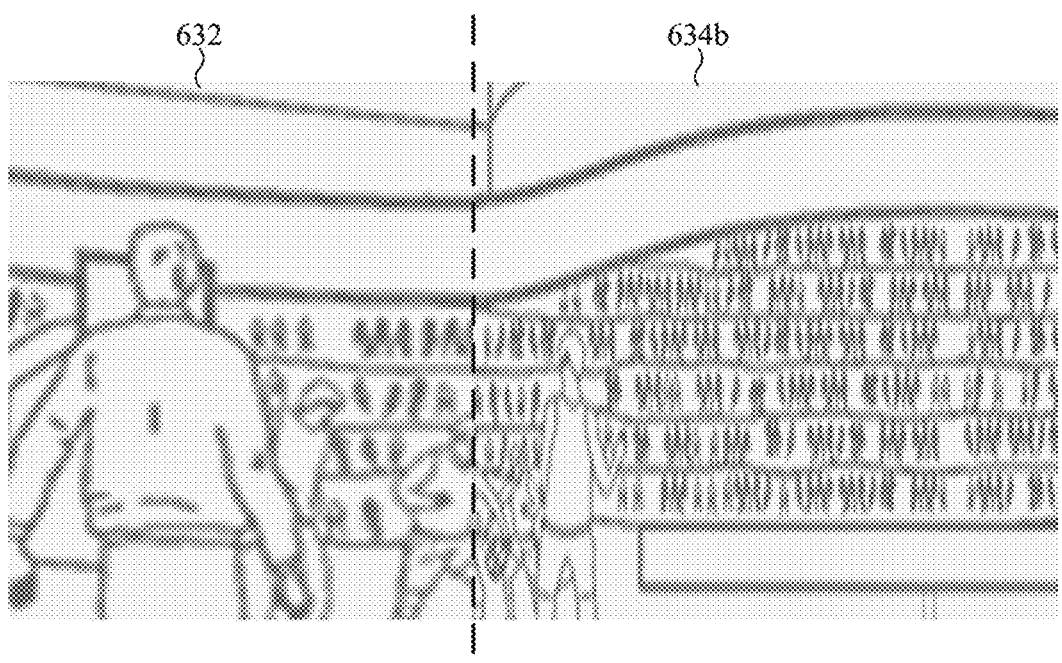
Figure 6D:
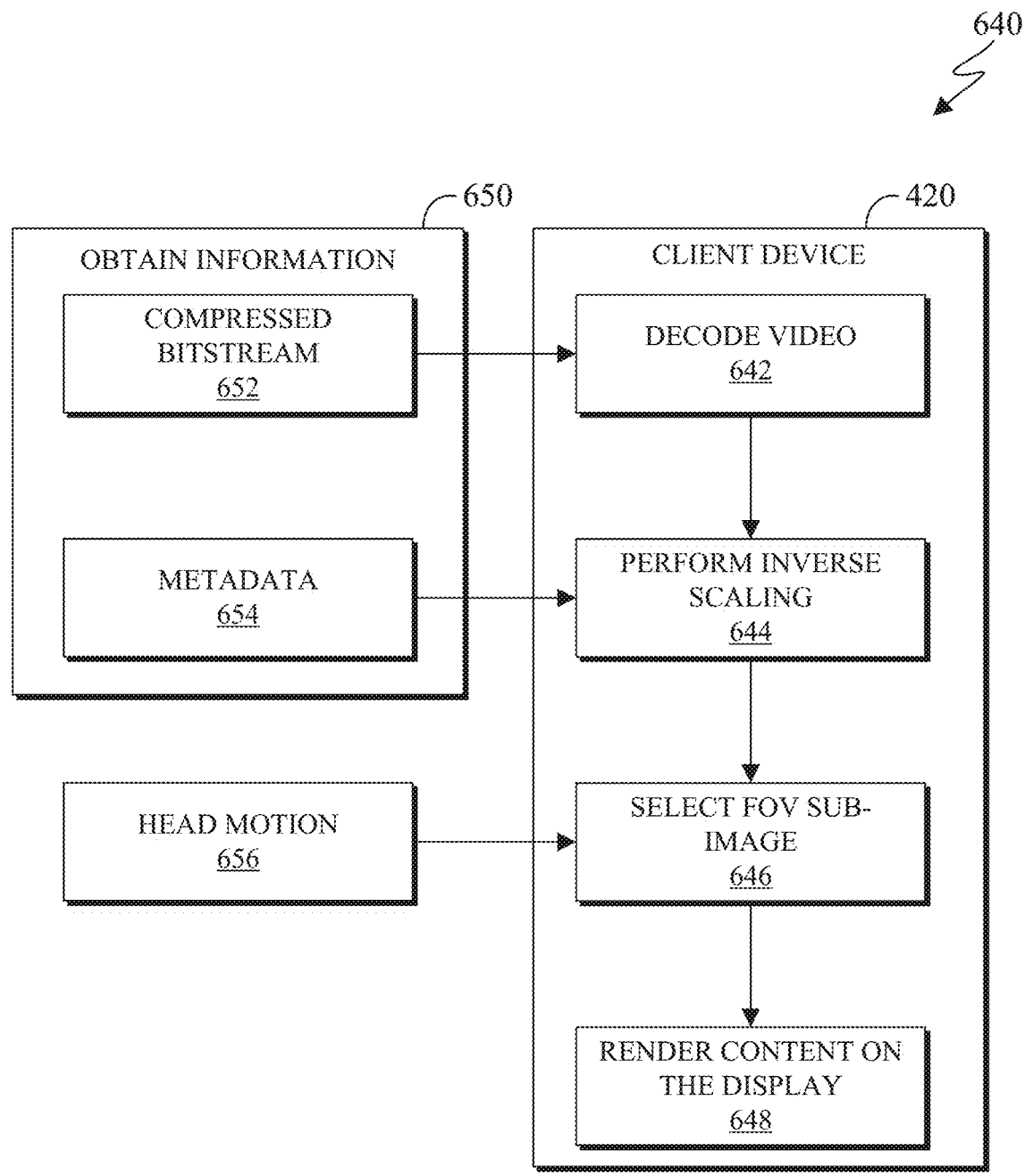
FIG. 6D illustrates an example method for decoding a split rendering in accordance with an embodiment of this disclosure.

FIG. 6A illustrates an example method 600 for scaling a split rendering in accordance with an embodiment of this disclosure. FIGS. 6B and 6C illustrates diagrams 620 and 630, respectively, for scaling an extended FoV based on motion in accordance with an embodiment of this disclosure. FIG. 6D illustrates an example method 640 for decoding a split rendering in accordance with an embodiment of this disclosure.

The methods 600 and 640 are described as implemented by any one of the client device 106-116 of FIG. 1, the server 104 of FIG. 1, the electronic device 410 of FIG. 4A, or the client device 420 of FIG. 4A and can include internal components similar to that of server 200 of FIG. 2 and the electronic device 300 of FIG. 3. However, the method 600 as shown in FIG. 6A and the method 640 as shown in FIG. 6D could be used with any other suitable electronic device and in any suitable system. The embodiments of FIGS. 6A-6D are for illustration only. Other embodiments can be used without departing from the scope of this disclosure.

For ease of explanation, the method 600 of FIG. 6A is described as being performed by the electronic device 410 of FIG. 4A and the method 640 of FIG. 6D is described as being performed by the client device 420 of FIG. 4A.

In addition to extending the FoV based on the speed and direction of the motion data, embodiments of the present disclosure describe that the extended video can be compressed and scaled differently than the video corresponding to the FoV that is identified in step 504 of FIG. 5A. For example, the extended FoV (such as the extended FoV 444 of FIG. 4C) can be compacted so as to not increase the size of the video frame. Scaling the video corresponding to the FoV or the extended FoV can reduce the special resolution.

The method 600 as shown in FIG. 6A is similar to the method 500 of FIG. 5A. Therefore, for brevity the steps that are repeated in both FIGS. 5A and 6A are omitted here in the description of FIG. 6A.

In step 602, the electronic device 410 generates a scaling factor for the video corresponding to the extended FoV. After the video is rendered in step 510, the electronic device 410 uses the identified head velocity (of step 506) to generate the scaling factor. The amount of scaling is based on the head speed (velocity) as determined by the motion data or using multiple viewpoints. For example, the volumetric video is rendered, the extended FoV sub-image is scaled appropriately along the direction of the head motion. Different scaling factors can be used such as ½, ⅓, ⅔, ¾, and the like. Other scale factors can be used as well. The scale factors can be adapted based on the head velocity so as to maintain the final size of the extended FoV region. For example, if the head velocity is very high a stronger scaling (i.e. lower scaling factor) can be used. If the head velocity is low, a weak scaling (i.e. higher scaling factor) or no scaling can be used.

Syntax (1) below describes an example process for generating the scaling factor, S, for the extended FoV.

```
Syntax                                          (1)
   if ( | hv | < t_slow)
      s = 1; /* no scaling */
   else if ( | hv | < t_normal)
      s = p; /* low amount of scaling */
   else
      s = q; /* high amount of scaling */
```

Here, q and p are predetermined constants, where $q \leq p \leq 1$. Additionally, t slow and t normal are thresholds used to determine whether the head speed is considered slow or fast. Moreover, hv is the magnitude of the head velocity. It can be based on $\max(\text{abs}(hv_x), \text{abs}(hv_y))$, $\text{sqrt}(hv_x * hv_x, hv_y * hv_y)$, and the like.

In certain embodiments, the scaling factor can be different for horizontal and vertical directions.

In certain embodiments, the video corresponding to the extended FoV (such as the extended FoV 444 of FIG. 4C) can be compacted such as illustrated in FIG. 6C. In certain embodiments, the video corresponding to the original FoV sub-image (such as the viewpoint 442 of FIG. 4C) is not compacted. In other embodiments, the video corresponding to the original FoV sub-image (such as the viewpoint 442 of FIG. 4C) is compacted with scale factors that are different than those used for the extended FoV (such as the extended FoV 444 of FIG. 4C).

Compacting the video corresponding to the extended FoV (and not the identified FoV) can lower the probability of missing data since the electronic device 410 can include more video content. Even though the video corresponding to the extended FoV will have a lower spatial resolution than the identified FoV, this may not reduce the visual quality of the image since the extended FoV image would likely remain in the peripheral vision of the user.

In step 512a, the electronic device 410 compresses the resulting rendered video frame using a video encoder. For example, compacted extended FoV and the FoV image are compressed using a video encoder. In step 514a, the electronic device transmits the compressed video back to the client device 420. In step 605, the electronic device 410 transmits metadata to the client device 420. The metadata can include scaling factor, constants (b, c, d, e) and head velocity ($hv_x, hv_y$), and the like. In certain embodiments, the metadata can also include the head velocity. The scaling factor that is transmitted to the client device 420, enables the client device 420 to invert the scaling.

In certain embodiments, the scaling factor and the portions of the video that are transmitted to the client device 420 can be multiplexed together.

FIG. 6B illustrates the diagram 620 for scaling the extended FoV 624. As illustrated in the diagram 620, the extended FoV is scaled by a factor S, while the FoV 426 is not scaled. The input image (as shown in the diagram 520 FIG. 4B) has a width based on the difference between eFoV_R and eFoV_L, and a height that is based on the difference between eFoV_B and eFoV_T. The scaled image as shown in the diagram 620 has a width that is sFoV_R and a height that is sFoV_B.

FIG. 6C illustrates the diagram 630 for scaling the extended FoV. The video content of the diagram 630 is similar to the video content of FIG. 4C. The diagram 630 of FIG. 6C illustrates the electronic device 410 determining the extended FoV 634a based on the viewpoint 632 and the motion 636 that are received from the client device 420. Based on the motion 636, the electronic device 410 determines the scaling factor and generates a video corresponding to the compacted extended FoV 634b, which can be transmitted to the client device 420, along with the scaling factor used when generating the compacted extended FoV 634b. The amount that the video corresponding to the extended FoV 634a is compacted is based on the motion of the client device 420. In certain embodiments, the electronic device 410 can also compact the video corresponding to the viewpoint 632 using the same or different scaling factor that is used for the video corresponding to the extended FoV 634a.

The method 640 as shown in FIG. 6D describes the client device 420 decoding, descaling, and rendering a portion of the video content on a display for a user. The client device 420 obtains information 650 from the electronic device 410. The obtained information can include compressed and scaled bitstream 652 and metadata 654. The compressed and scaled bitstream 652 represents a portion of the video content. The metadata 654 includes the scaling factor, the extended FoV constants. The metadata 654 can also include the speed (velocity) of the client device 420. In certain embodiments, the client device 420 previously sent the speed (velocity) to the electronic device 410. In certain embodiments, if the client device 420 sent viewpoint information to the electronic device 410, then the electronic device 410 determined the speed (velocity) of the client device 420.

In step 642, the client device 420 decompresses a received compressed and scaled bitstream 652. In step 644, the client device 420 uses the metadata 654 to do inverse scaling. The client device 420 using the most recent head motion information 656, selects a portion of the FoV and renders it on a display (step 648).

Although FIGS. 6A and 6D illustrate the methods 600 and 640, various changes may be made to FIGS. 6A and 6D. For example, while shown as a series of steps, various steps in FIGS. 6A and 6D could overlap, occur in parallel, or occur any number of times. The embodiments of FIGS. 6A-6D are for illustration only. Other embodiments can be used without departing from the scope of this disclosure.

Figure 7A:
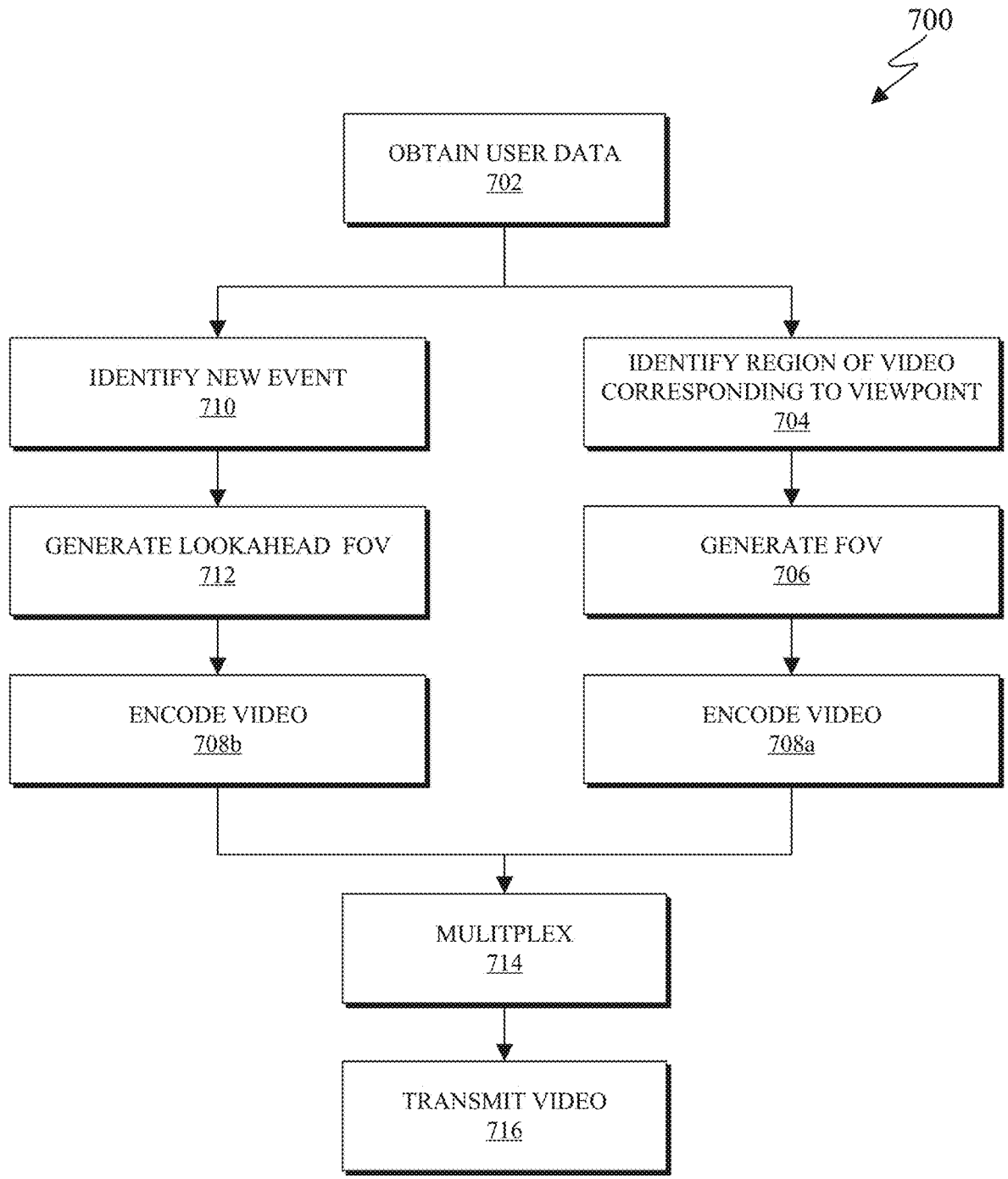
FIG. 7A illustrates an example method for event based lookahead split rendering in accordance with an embodiment of this disclosure.
Figure 7B:
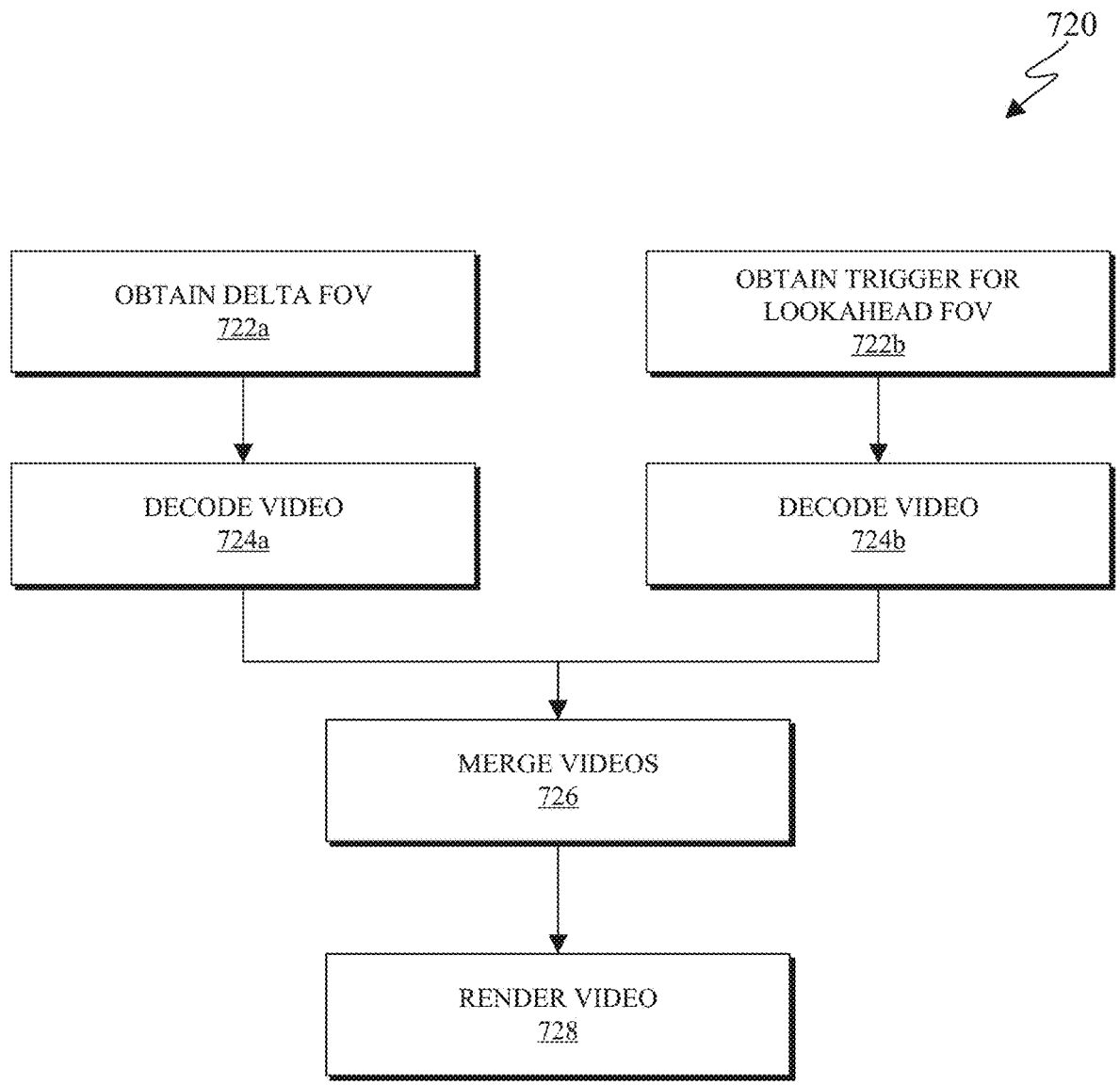
FIG. 7B illustrates an example method for decoding an event based lookahead split rendering in accordance with an embodiment of this disclosure.
Figure 7C:
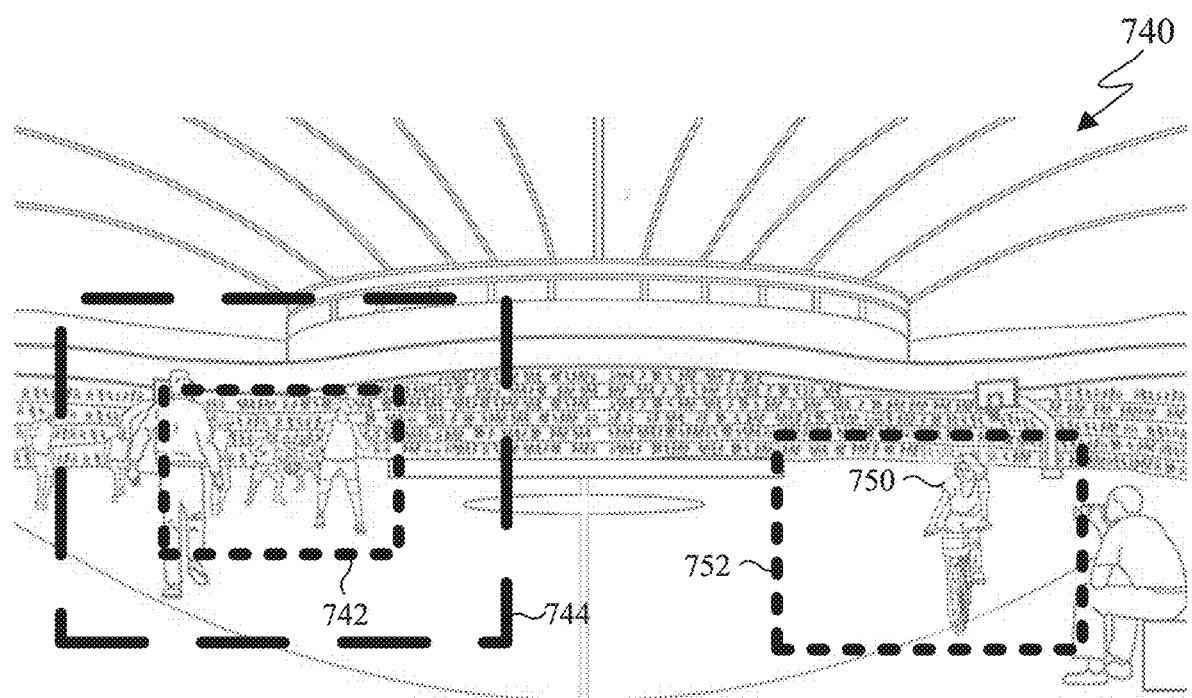
FIG. 7C illustrates a diagram of a lookahead FoV corresponding to a future event in accordance with an embodiment of this disclosure.

FIG. 7A illustrates an example method 700 for event based lookahead split rendering in accordance with an embodiment of this disclosure. FIG. 7B illustrates an example method 720 for decoding an event based lookahead split rendering in accordance with an embodiment of this disclosure. FIG. 7C illustrates a diagram 740 of a lookahead FoV corresponding to a future event in accordance with an embodiment of this disclosure.

In certain embodiments, another extended FoV can be transmitted to from the electronic device 410 to the client device 420 based on events that occur within of the video content. Contents with predefined stories or logics have predefined events, which might draw the attention of the user, such as when an enemy is introduced into a scene of a movie or game. For example, users who watch any episodic contents or play computer games there will be some events the viewpoint of a user may be directed to such as introduction of new objects, modification of some existing objects, or removal of any existing objects and the like.

Event based look enables the electronic device 410 to identify the events that will happen in the future within the MTP latency but in an area of the video content that is beyond the extended FoV. In certain embodiments, the events could require the user to view them. In other embodiments, if such event matches with a user's interest (as specified in user interest data), the electronic device 410 can render the predicted events before it happens and include the region showing such events as a part of the extended FoV even if the area for such events is not direct extension of extended FoV calculated based on MTP latency. That is, the additional region can be separate from the extended FoV. The electronic device 410 can access the information about the contents and find the events that will occur in the future based on such content information. The electronic device 410 can then decide whether to include some, all, or none of the events as an additional extended FoV according to the preferences the users or the general behavior of the users.

In certain embodiments, if the electronic device 410 knows of an event that will occur in the video content in the near future (beyond current MTP latency), then the electronic device 410 can render the predicted event before it happens and sent it to the client device 420 for later viewing. Upon receiving the additional extended FoV associated with the future event, the client device 420 can store the data for later use. For example, the electronic device 410 can render the predicted events which will happen in the near future before it happens and send it to the client device 420 for later use while it is sending the video for current FoV and extended FoV based on MPT latency. The client device 420 will receive such additional video and store it in the local storage and if the user moves to the area the events happens when the events actually happens then the encodes of the electronic device 410 transmits the difference between the previously sent lookahead FoV video and scene of the actual events happening and send it to the client device 420 as well, then the client decode and display combined video.

The methods 700 and 720 are described as implemented by any one of the client device 106-116 of FIG. 1, the server 104 of FIG. 1, the electronic device 410 of FIG. 4A, or the client device 420 of FIG. 4A and can include internal components similar to that of server 200 of FIG. 2 and the electronic device 300 of FIG. 3. However, the method 700 as shown in FIG. 7A and the method 720 as shown in FIG. 7B could be used with any other suitable electronic device and in any suitable system. The embodiments of FIGS. 7A-7C are for illustration only. Other embodiments can be used without departing from the scope of this disclosure.

For ease of explanation, the method 700 of FIG. 7A is described as being performed by the electronic device 410 of FIG. 4A and the method 720 of FIG. 7B is described as being performed by the client device 420 of FIG. 4A.

In step 702 of FIG. 7A, the electronic device 410 obtains user data. the user data can include a viewpoint, multiple viewpoints, motion data, or a combination thereof. The user data can also include preferences of the user, such as events in the video content that the user prefers to view. In step 704, the electronic device 410 identifies a region of the video centered around the user viewpoint. In step 706, the electronic device 410 generates a video corresponding to the FoV based on the identified region (of step 704). In step 708a the electronic device 410 compresses the resulting rendered video frame using a video encoder.

In step 710, the electronic device 410 identifies a future event that will occur in in the video content. For example, the electronic device 410 accesses information about the content. The electronic device 410 can predict new events based on the information about the content and user data (such as the events of interest to the user). The electronic device 410 then decides the future events to be included in the additional video based on the user data.

In step 712, the electronic device 410 renders lookahead FoV to cover the movement of the user to the future event if the lookahead FoV is not connected to the current FoV or in the extended FoV. This can be based on MTP latency where the amount of lookahead time is based on the user data. In step 708b, the electronic device 410 encodes the lookahead FoV as a separate video from the current FoV (which was encoded in step 708a).

In step 714, the electronic device 410 can multiplex the encoded FoV (of step 708a) and the encoded lookahead FoV (of step 708b). In certain embodiments, the electronic device 410 can statistically multiplex the encoded FoV (of step 708a) and the encoded lookahead FoV (of step 708b) to keep the bandwidth consistent. In step 716, the electronic device 410 can transmit the video to the client device.

In certain embodiments, when the lookahead FoV is to be rendered, the electronic device 410 encodes difference between the video sent as a lookahead FoV and the final FoV according to the current user data. The difference between the lookahead FoV and the final FoV is referred to as a delta FoV. Thereafter, when the electronic device 410 triggers playback of a lookahead FoV, then the client device 420 renders and displays the previously received lookahead FoV and merge it with delta FoV.

In step 722a of FIG. 7B, the client device 420 obtains from the electronic device 410, the delta FoV. In step 722b, the client device 420 also obtains a trigger for the lookahead FoV. The trigger can be the lookahead FoV with a time stamp. In step 724a and 724b, the client device 420 decodes the delta FoV and the lookahead FoV, respectively. In step 726, the client device 420 merges the two videos together. In step 728, the client device 420 renders and displays the merged video for the user to view.

The diagram 740 of FIG. 7C includes a 360° video. The electronic device 410 parses the video to find any events that occur within the video based on content information. The diagram 740 includes viewpoint 742 and an extended FoV 744. The viewpoint 742 can represent a current FoV and the extended FoV 744 can be based on the head motion of a user. The electronic device 410 can identify, from the content information, that an event 750 (here, the event is a person cycling on the basketball court) will occur at a time T. The electronic device 410 can then generate a lookahead FoV 752 and transmit it to the client device 420. In certain embodiments, the electronic device 410 can determine whether to send the lookahead FoV 752 based on preferences of the user that are received from the client device. The electronic device 410 can separately encode the lookahead FoV 752 and the extended FoV 744 when sending the content to the client device 420.

In certain embodiments, the electronic device 410 transmits both the extended FoV 744 and the lookahead FoV 752.

In certain embodiments, the electronic device 410 transmits a single image that includes both the extended FoV 744 and the lookahead FoV 752 and video content between the two FoV's.

Although FIGS. 7A and 7B illustrate the methods 700 and 720, various changes may be made to FIGS. 7A and 7B. For example, while shown as a series of steps, various steps in FIGS. 7A and 7B could overlap, occur in parallel, or occur any number of times. The embodiments of FIGS. 7A and 7B are for illustration only. Other embodiments can be used without departing from the scope of this disclosure.

Figure 8A:
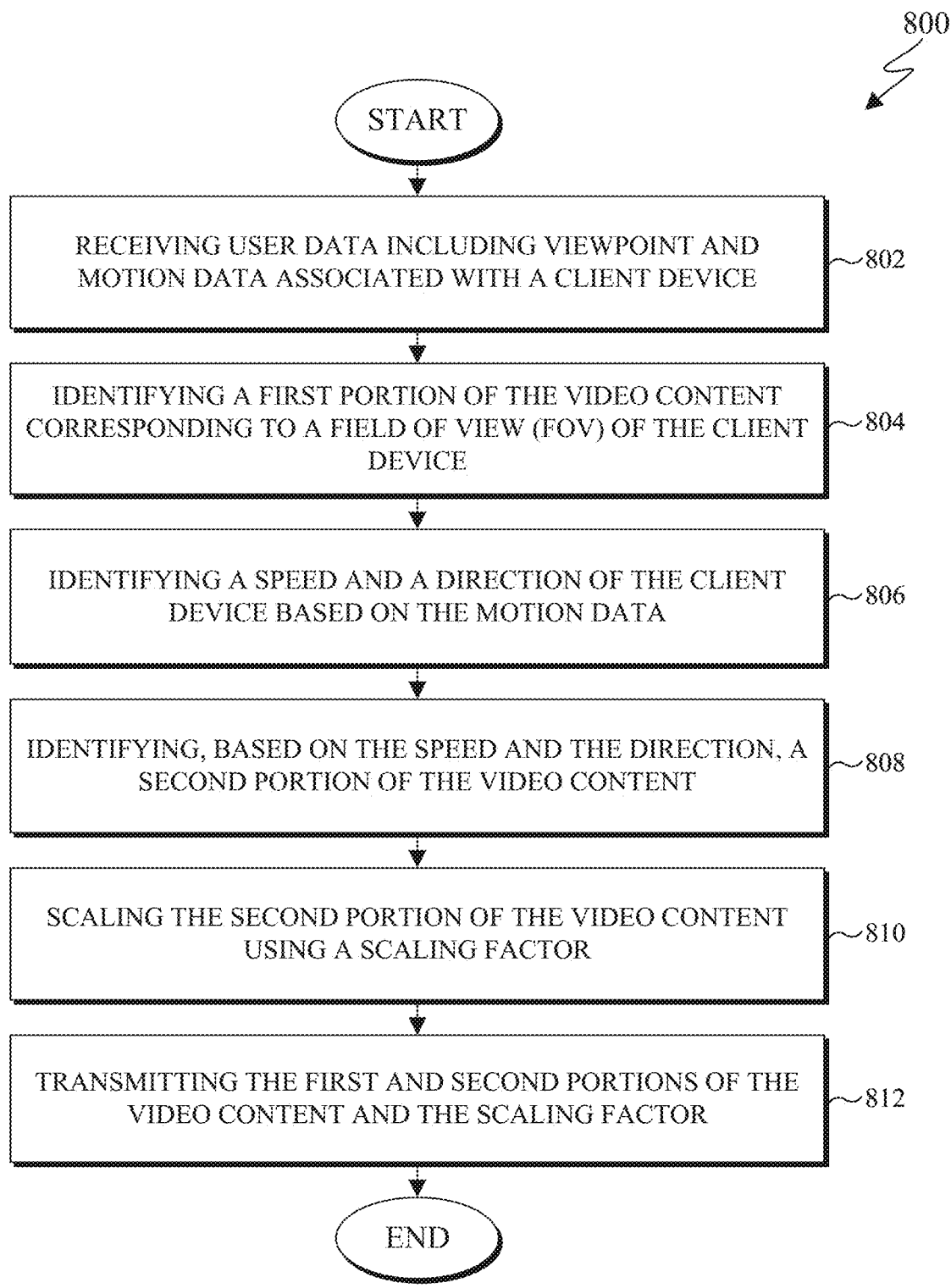
FIGS. 8A and 8B illustrate methods for split rendering of video content in accordance with an embodiment of this disclosure.
Figure 8B:
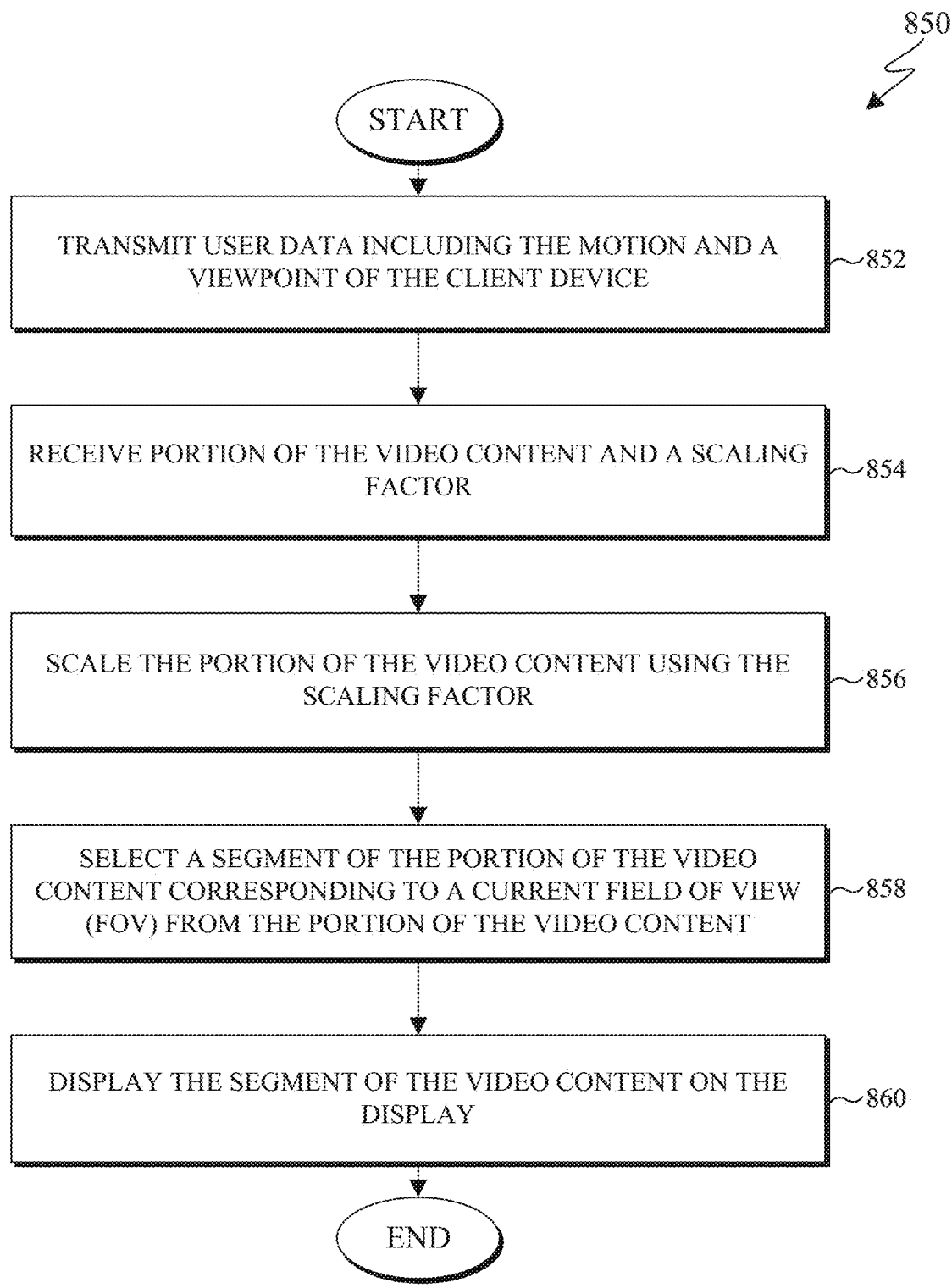

FIGS. 8A and 8B illustrate methods 800 and 850, respectively, for split rendering of video content in accordance with an embodiment of this disclosure. In particular, the method 800 of FIG. 8A describes a server selecting portions of the video content while the method 850 of FIG. 8B describes a client device receiving and displaying the portion of the received video content. The method 800 and 850 are described as implemented by any one of the client device 106-116 of FIG. 1, the server 104 of FIG. 1, the electronic device 410, or the client device 420, and can include internal components similar to that of server 200 of FIG. 2 and the electronic device 300 of FIG. 3. However, the method 800 as shown in FIG. 8A and the method 850 shown in FIG. 8B could be used with any other suitable electronic device and in any suitable system.

For ease of explanation, the method 800 is described as being performed by the electronic device 410 of FIG. 4A and the method 850 is described as being performed by the client device 420 of FIG. 4A.

As shown in the method 800 of FIG. 8A, the electronic device 410 receives user data (step 802). In certain embodiments, the user data is received from a client device, such as the client device 420. The user data can include viewpoint data associated with a client device 420. The viewpoint data indicates a portion of the 360° video that client device 420 is displaying for the user to view. The user data can also include multiple viewpoints, providing information for the electronic device (in step 806) to determine the speed and direction of the client device. The user data can also include motion data. The motion data indicates motion of the client device 420. For example, the motion data can indicate a velocity or speed of the client device 420. The motion data can also indicate a direction of the motion. For example, if the client device 420 is an HMD (such as the HMD 116 of FIG. 1), then as the user moves their head, the client device 420 would also move.

In certain embodiments, the user data can correspond to one or more time instances. That is, the user data can correspond to a particular instance in time or multiple consecutive instances in time. For example, if the user data corresponds to a single instance in time, then the user data indicates a viewpoint and motion at a particular time. If the user data corresponds to multiple consecutive time instances, then the user data indicates multiple viewpoints over the user and the motion data indicating the speed and direction of client device 420.

In step 804, the electronic device 410 identifies a first portion of video content. The video content can be XR content. The first portion of the video content can correspond to a FoV of the client device 420. In certain embodiments, the FoV is based on the viewpoint at a current time instance.

In step 806, the electronic device 410 identifies a speed and direction of the client device 420. The electronic device 410 can identify the speed and direction of the client device 420 based on the received motion data. That is, the motion data indicates a particular speed and direction of the client device at a current time instance. The electronic device 410 can identify the speed and direction of the client device 420 based on viewpoints from a set of consecutive time instances including the current time.

In step 808, the electronic device 410 identifies a second portion of the video content. The electronic device 410 can use the identified speed and direction (from step 806) to determine the size of the second portion of the video content. The second portion of the video content can extend from the first portion of the video content thereby expanding the first portion of the video content. In certain embodiments, the second portion of the video content extends asymmetrically. For example, the second portion of the video content extends asymmetrically along a direction as indicated in the motion data. That is, the second portion of the video content extends asymmetrically in a direction that corresponds to a direction that the client device 420 is moving. By extending the second portion of the video content asymmetrically along a particular direction, such the direction corresponding to the direction of the motion of the client device, enables electronic device 410 to provide more video content along a particular direction to the client device 420.

In certain embodiments, the amount that the second portion of the video content is extended can be based on the speed (or velocity) of the head movement. A slow speed can indicate that the client device 420 is moving slowly and does not need a large extended video portion. In contrast, a high speed indicates that the client device 420 is moving fast and therefore the client device 420 could need an increase the extended video portion. Since the client device continues to move after sending the user data to the electronic device 410 and before receiving the video content from the electronic device 410, the second portion of the video content enables the client device to display a portion of the received video content corresponding to the actual FoV, which could be different than the FoV that the electronic device 410 identified. As such, the amount that the second portion of the video content extends is based on the speed (velocity) of the client device. If the speed (velocity) of the client device 420 is slow (less than a threshold) indicates that the second portion of the video content can be reduced to decrease bandwidth. If the speed (velocity) of the client device 420 is high (larger than a threshold) indicates that the second portion of the video content should be increased as a safeguard to confirm that the client device 420 receives enough video content to be rendered and displayed for the user.

In step 810, the electronic device 410 scales the second portion of the video content using a scaling factor. In certain embodiments, the electronic device 410 identifies the scaling factor based on the speed (velocity) of the client device 420. For example, the electronic device 410 compares the speed to a threshold speed. The electronic device 410 can set the scaling factor to that of the first portion of the video content based on the speed being less than the threshold. That is, if the speed is less than a threshold, then the electronic device 410 uses the same scaling factor to scale the first portion of the video content and the second portion of the video content. Alternatively, the electronic device 410 can set the scaling factor to a different value. For example, if the speed is greater than the threshold, then the electronic device 410 uses a scaling factor that adds additional scaling to the second portion of the video content, beyond any scaling that is applied to the first portion of the video content. In certain embodiments, the amount of scaling cab be based on the speed (velocity) of the client device.

In certain embodiments, the electronic device 410 obtains content information. The electronic device 410 can then identify an event that occurs within the video content based on the obtained content information. The event corresponds to a portion of the video content that is separate from the first and second portions of the video content. For example, if the video content is a movie or a game, the event could correspond to an actor/character performing an action on a portion of the video where the user is not currently looking. The electronic device 410 can then determine whether to transmit a third portion of the video content to the client device 420, based on the content information.

In certain embodiments, the user data includes preferences of a user of the client device. The preferences of the user can indicate certain events of the video content that the user would like to view. The electronic device 410 can then determine whether to transmit a third portion of the video content to the client device 420, based on the content information and the preferences of the user. For example, if the content information indicates that an event will occur at Time, T, and the event is specified as a preference of the user, as indicated in the user data, then the electronic device 410 can determine to generate a third portion of the video content that corresponds to the event.

In step 812, the electronic device 410 transmits the scaling factor as well as the first and second video portions of the video content to the client device 420. In certain embodiments, the electronic device 410 transmits the scaling factor and the second portion of the video content to the client device, since the second portion of the video content includes the first portion of the video content.

In certain embodiments, the electronic device 410 renders the 3D XR content into two dimensional video frames. The electronic device 410 can also encode the first and second portions of the two dimensional video frames. Thereafter the electronic device 410 can transmit the two dimensional video frames to the client device 420.

In certain embodiments, if the electronic device receives content information and determines to transmit the third portion of the video content corresponding to an event as indicated by the content information, the electronic device 410 transmits the first, second and third portions of the video content to the client device 420.

In certain embodiments, if the content information indicates that an event will occur at Time, T, and the event is specified as a preference of the user, as indicated in the user data, then the electronic device 410 can generate a third portion of the video content. The electronic device 410 can then transmit the first, second and third portions of the video content to the client device 420.

As shown in the method 850 of FIG. 8B, a client device 420 transmits user data to an electronic device 410 (step 852). The user data can include motion data. The motion data can indicate a direction of motion, a speed of the motion, or both. The user data can also include a viewpoint, such as a viewing direction. In certain embodiments, the user data can include preferences that specifies certain events in the video content that the user wants to view.

In step 854, the client device 420 receives a portion of the video content and a scaling factor. In certain embodiments, the portion of the video content is larger than a FoV of the client device. In certain embodiments, the portion of the video content can be asymmetrical.

In step 856, the client device 420 scales the portion of the video content using the scaling factor. In certain embodiments, the client device 420 determines that the portion of the video content (received in step 854) includes a first portion and a second portion. The first portion can correspond to a FoV corresponding to the time that the motion data and viewpoint were transmitted (step 852). The second portion can extend from the first portion asymmetrically along a direction of the motion. The client device 420 then scales the second portion of the video content using the scaling factor.

In step 858, the client device 420 selects a segment of the portion of the video that corresponds to the current FoV. The viewpoint that is transmitted to the client device in step 852 is a first viewpoint corresponding to a first time. The client device 420 identifies a second viewpoint after the portion of the video content is received at step 854. The second viewpoint corresponds to a second time that is after the first time. The client device 420 selects the segment of the received video content that corresponds to the second viewpoint. Since the client device 420 can move positions from the first time and to the second time, the client device 420 selects a segment corresponding to the second time.

In step 860, the client device 420 displays the segment of the video content on its display.

Although FIGS. 8A and 8B illustrates one example of a methods 800 and 850 for split rendering video content, various changes may be made to FIGS. 8A and 8B. For example, while shown as a series of steps, various steps in FIGS. 8A and 8B could overlap, occur in parallel, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An electronic device comprising:
a communication interface configured to receive user data including viewpoint data and motion data associated with a client device;
a processor operably coupled to the communication interface, the processor configured to:
identify a first portion of video content corresponding to a field of view (FoV) of the client device based on the viewpoint data,
identify a speed and a direction of the client device based on the motion data,
identify, based on the speed and the direction, a second portion of the video content extending from the first portion of the video content and expanding the FoV, and
compare the speed to a threshold speed;
scale a spatial resolution of the second portion of the video content using a scaling factor that is determined based on the comparison of the speed to the threshold speed; and
the communication interface is further configured to transmit the first portion of the video content, the scaled second portion of the video content, and the scaling factor to the client device, wherein the first portion of the video content and the scaled second portion of the video content are disposed within a same video frame.

2. The electronic device of claim 1, wherein the second portion of the video content extends asymmetrically along the direction of the motion data.

3. The electronic device of claim 1, wherein the processor is further configured to:
set the scaling factor to that of the first portion of the video content based on the speed being less than the threshold speed.

4. The electronic device of claim 1, wherein the processor is further configured to:
set the scaling factor to apply additional scaling than that of the first portion of the video content based on the speed being greater than the threshold speed.

5. The electronic device of claim 1, wherein:
the user data corresponds to multiple consecutive time instances;
the processor is further configured to:
identify the FoV based on the viewpoint data at a current time instance of the multiple consecutive time instances; and
identify the speed and the direction based on the motion data corresponding to a set of consecutive time instances including the current time instance of the multiple consecutive time instances.

6. The electronic device of claim 1, wherein:
the video content is three dimensional extended reality content; and
the processor is further configured to:
render the three dimensional extended reality content into two-dimensional video frames,
encode the first and second portions using the two-dimensional video frames, and
transmit the two-dimensional video frames to the client device.

7. The electronic device of claim 1, wherein the processor is further configured to:
identify an event that occurs within the video content based on obtained content information, the event located in a third portion of the video content;
determine whether to transmit the third portion of the video content based on the content information; and
in response to determining to transmit the third portion of the video content, cause the communication interface to transmit the first, second and third portions of the video content to the client device.

8. The electronic device of claim 7, wherein:
the user data includes preferences of a user of the client device; and
the processor is further configured to:
determine whether to transmit the third portion of the video content based on the content information and the preferences, and in response to determining to transmit the third portion of the video content, cause the communication interface to transmit the first, second and third portions of the video content to the client device.

9. A method for split rendering of video content, the method comprises:
receiving user data including viewpoint data and motion data associated with a client device;
identifying a first portion of the video content corresponding to a field of view (FoV) of the client device based on the viewpoint data;
identifying a speed and a direction of the client device based on the motion data;
identifying, based on the speed and the direction, a second portion of the video content extending from the first portion of the video content and expanding the FoV;
comparing the speed to a threshold speed;
scaling a spatial resolution of the second portion of the video content using a scaling factor that is determined based on the comparison of the speed to the threshold speed; and
transmitting the first portion of the video content, the scaled second portion of the video content, and the scaling factor to the client device, wherein the first portion of the video content and the scaled second portion of the video content are disposed within a same video frame.

10. The method of claim 9, wherein the second portion of the video content extends asymmetrically along the direction of the motion data.

11. The method of claim 9, further comprising:
setting the scaling factor to that of the first portion of the video content based on the speed being less than the threshold speed.

12. The method of claim 9, further comprising:
setting the scaling factor to apply additional scaling than that of the first portion of the video content based on the speed being greater than the threshold speed.

13. The method of claim 9, wherein:
the user data corresponds to multiple consecutive time instances;
identifying the FoV is based on the viewpoint data at a current time instance of the multiple consecutive time instances; and
identifying the speed and the direction is based on the motion data corresponding to a set of consecutive time instances including the current time instance of the multiple consecutive time instances.

14. The method of claim 9, wherein:
the video content is three dimensional extended reality content; and
the method further comprises:
rendering the three dimensional extended reality content into two-dimensional video frames
encoding the first and second portions using the two-dimensional video frames, and
transmitting the two-dimensional video frames to the client device.

15. The method of claim 9, further comprising:
identifying an event that occurs within the video content based on obtained content information, the event located in a third portion of the video content;
determining whether to transmit the third portion of the video content based on the content information; and
in response to determining to transmit the third portion of the video content, transmitting the first, second and third portions of the video content to the client device.

16. The method of claim 15, wherein:
the user data includes preferences of a user of the client device; and
the method further comprises
determining whether to transmit the third portion of the video content based on the content information and the preferences, and
in response to determining to transmit the third portion of the video content, transmitting the first, second and third portions of the video content to the client device.

* * * * *